(12) United States Patent
Willis et al.

(10) Patent No.: US 9,077,777 B2
(45) Date of Patent: Jul. 7, 2015

(54) ENCAPSULATING/DECAPSULATING DATA IN HARDWARE

(71) Applicant: Juniper Networks, Inc., Sunnyvale, CA (US)

(72) Inventors: Steven R Willis, Acton, MA (US); Gregg F Bromley, Northborough, MA (US); Eric S Crawley, Bolton, MA (US); Frank Kastenholz, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 75 days.

(21) Appl. No.: 13/872,904

(22) Filed: Apr. 29, 2013

(65) Prior Publication Data
US 2013/0238810 A1    Sep. 12, 2013

Related U.S. Application Data

(60) Continuation of application No. 12/869,571, filed on Aug. 26, 2010, now Pat. No. 8,432,921, which is a continuation of application No. 10/665,349, filed on Sep. 22, 2003, now Pat. No. 7,809,015, which is a
(Continued)

(51) Int. Cl.
*H04J 3/16* (2006.01)
*H04L 29/06* (2006.01)
(Continued)

(52) U.S. Cl.
CPC .......... *H04L 65/4069* (2013.01); *H04L 45/742* (2013.01); *H04L 2012/5618* (2013.01); *H04L 2012/5658* (2013.01); *H04L 2012/5665* (2013.01); *H04L 2012/5667* (2013.01); *H04L 2012/5669* (2013.01); *H04Q 11/0478* (2013.01)

(58) Field of Classification Search
CPC .............. H04L 65/4069; H04L 45/742; H04L 2012/5618; H04L 2012/5658; H04L 2012/5665; H04L 2012/5667; H04L 2012/5669; H04Q 11/0478
See application file for complete search history.

(56) References Cited

U.S. PATENT DOCUMENTS

| 4,998,242 A | 3/1991 | Upp |
| 5,081,654 A | 1/1992 | Stephenson et al. |

(Continued)

FOREIGN PATENT DOCUMENTS

| AU | A-48511/97 | 6/1998 |
| EP | 0797373 | 9/1997 |

(Continued)

OTHER PUBLICATIONS

Kato et al., "TCP Gateway Improving Throughput of TCT/IP Over Wide Area ATM Networks," XVI World Telecom Congress Proceedings, vol. 1, 1997, pp. 35-42.

(Continued)

*Primary Examiner* — Robert Wilson
(74) *Attorney, Agent, or Firm* — Harrity & Harrity, LLP

(57) ABSTRACT

A forwarding node decapsulates and encapsulates data. The decapsulation may be performed using pattern matching techniques and the encapsulation may be performed using pattern insertion techniques. The decapsulation and encapsulation are preferably performed by hardware devices such as application specific integrated circuits (ASICs) to enhance the speed of such operations. The decapsulation and encapsulation may be independent of each other and performed on a per virtual circuit basis.

20 Claims, 23 Drawing Sheets

Related U.S. Application Data division of application No. 09/335,947, filed on Jun. 18, 1999, now Pat. No. 6,658,021.

(60) Provisional application No. 60/090,028, filed on Jun. 19, 1998.

(51) Int. Cl.
*H04L 12/747* (2013.01)
*H04Q 11/04* (2006.01)
*H04L 12/70* (2013.01)

(56) References Cited

U.S. PATENT DOCUMENTS

| | | | |
|---|---|---|---|
| 5,255,264 A | 10/1993 | Cotton et al. | |
| 5,278,824 A | 1/1994 | Kremer | |
| 5,367,520 A | 11/1994 | Cordell | |
| 5,490,252 A | 2/1996 | Macera et al. | |
| 5,526,351 A | 6/1996 | Mochinaga et al. | |
| 5,533,018 A | 7/1996 | De Jager et al. | |
| 5,568,486 A | 10/1996 | Huscroft et al. | |
| 5,600,653 A | 2/1997 | Chitre et al. | |
| 5,703,879 A | 12/1997 | Proctor et al. | |
| 5,729,546 A | 3/1998 | Gupta et al. | |
| 5,740,156 A | 4/1998 | Tanabe et al. | |
| 5,751,709 A | 5/1998 | Rathnavelu | |
| 5,764,645 A | 6/1998 | Bernet et al. | |
| 5,802,105 A | 9/1998 | Tiedemann, Jr. et al. | |
| 5,828,844 A | 10/1998 | Civanlar et al. | |
| 5,920,705 A | 7/1999 | Lyon et al. | |
| 5,936,965 A | 8/1999 | Doshi et al. | |
| 5,940,389 A | 8/1999 | Yang et al. | |
| 6,002,692 A | 12/1999 | Wills | |
| 6,047,002 A * | 4/2000 | Hartmann et al. | 370/466 |
| 6,049,542 A | 4/2000 | Prasad | |
| 6,052,364 A | 4/2000 | Chalmers et al. | |
| 6,052,373 A | 4/2000 | Lau | |
| 6,052,375 A | 4/2000 | Bass et al. | |
| 6,067,298 A | 5/2000 | Shinohara | |
| 6,075,630 A | 6/2000 | Nishio | |
| 6,075,788 A | 6/2000 | Vogel | |
| 6,115,373 A | 9/2000 | Lea | |
| 6,122,251 A | 9/2000 | Shinohara | |
| 6,122,281 A | 9/2000 | Donovan et al. | |
| 6,125,112 A | 9/2000 | Koning et al. | |
| 6,134,238 A | 10/2000 | Noh | |
| 6,185,635 B1 | 2/2001 | O'Loughlin et al. | |
| 6,195,346 B1 | 2/2001 | Pierson, Jr. | |
| 6,198,751 B1 | 3/2001 | Dorsey et al. | |
| 6,205,150 B1 | 3/2001 | Ruszczyk | |
| 6,205,154 B1 | 3/2001 | Schmidt et al. | |
| 6,219,728 B1 | 4/2001 | Yin | |
| 6,223,301 B1 | 4/2001 | Santeler et al. | |
| 6,236,660 B1 | 5/2001 | Heuer | |
| 6,237,029 B1 * | 5/2001 | Master et al. | 709/217 |
| 6,266,333 B1 | 7/2001 | Kartalopoulos | |
| 6,272,151 B1 | 8/2001 | Gupta et al. | |
| 6,314,097 B1 | 11/2001 | Ohara | |
| 6,331,978 B1 | 12/2001 | Ravikanth et al. | |
| 6,331,989 B1 | 12/2001 | Tezuka | |
| 6,343,326 B2 | 1/2002 | Acharya et al. | |
| 6,381,244 B1 | 4/2002 | Nishimura et al. | |
| 6,389,453 B1 * | 5/2002 | Willis | 709/204 |
| 6,408,005 B1 | 6/2002 | Fan et al. | |
| 6,418,145 B1 | 7/2002 | Isoyama et al. | |
| 6,463,096 B1 | 10/2002 | Raleigh et al. | |
| 6,466,591 B1 | 10/2002 | See et al. | |
| 6,466,976 B1 | 10/2002 | Alles et al. | |
| 6,477,168 B1 | 11/2002 | Delp et al. | |
| 6,487,198 B1 | 11/2002 | Pierson, Jr. | |
| 6,498,792 B1 | 12/2002 | Johnson et al. | |
| 6,611,522 B1 | 8/2003 | Zheng et al. | |
| 6,647,019 B1 | 11/2003 | McKeown et al. | |
| 6,658,021 B1 * | 12/2003 | Bromley et al. | 370/466 |
| 6,667,956 B2 | 12/2003 | Beshai et al. | |
| 6,771,663 B1 | 8/2004 | Jha | |
| 6,909,720 B1 | 6/2005 | Willis | |
| 6,975,631 B1 | 12/2005 | Kastenholz | |
| 6,980,543 B1 | 12/2005 | Kastenholz et al. | |
| 7,065,037 B1 | 6/2006 | Viswanathan et al. | |
| 7,100,020 B1 | 8/2006 | Brightman et al. | |
| 7,586,919 B2 | 9/2009 | Willis | |
| 7,809,015 B1 * | 10/2010 | Willis et al. | 370/466 |
| 8,432,921 B2 * | 4/2013 | Willis et al. | 370/395.51 |
| 2002/0041604 A1 | 4/2002 | Ferguson | |
| 2005/0201387 A1 | 9/2005 | Willis | |
| 2013/0238810 A1 * | 9/2013 | Willis et al. | 709/231 |

FOREIGN PATENT DOCUMENTS

| | | |
|---|---|---|
| WO | WO 9403004 | 3/1994 |
| WO | WO 9748211 | 12/1997 |
| WO | WO 9813764 | 4/1998 |
| WO | WO 9813975 | 4/1998 |

OTHER PUBLICATIONS

Keshav, "Issues and Trends in Router Design," IEEE Communications Magazine, vol. 36(5), 1998, pp. 144-151.

Parulkar, "A Strategy for Integrating IP with ATM," Computer Communications Review, vol. 25(4), 1995 pp. 49-58.

White, "ATM Switching and IP Routing Integration: The Next Stage in Internet Evolution?," IEEE Communications Magazine, vol. 36(4), 1998, pp. 79-83.

Newton, Newton's Telecom Dictionary, Flatiron Publishing, a division of Miller Freeman, Inc., 14$^{th}$ Edition, pp. 663 and 664.

Itu, Network Node Interface for the Synchronous Digital Hierarch (SDH) (ITU G.707) dated Mar. 1996, pp. ii-132.

David E. McDysan et al., "ATM Theory and Application," 1994, pp. 1-100.

Office Action from U.S. Appl. No. 12/510,342 dated Dec. 17, 2010, 13 pages.

* cited by examiner

ENCAPSULATING/DECAPSULATING DATA IN HARDWARE

RELATED APPLICATIONS

This application is a continuation of U.S. application Ser. No. 12/869,571, filed Aug. 26, 2010, now U.S. Pat. No. 8,432,921, which is a continuation of U.S. application Ser. No. 10/665,349, filed Sep. 22, 2003, now U.S. Pat. No. 7,809,015, which is a division of U.S. patent application Ser. No. 09/335,947, filed Jun. 18, 1999, now U.S. Pat. No. 6,658,021, which claims the benefit of priority under 35 U.S.C. 119(e) to U.S. Provisional Application Ser. No. 60/090,028, filed Jun. 19, 1998, the entire contents of which are incorporated herein by reference.

TECHNICAL FIELD

The present invention relates generally to switching nodes and more particularly to a method and system for performing encapsulation and decapsulation on a per channel basis with hardware.

BACKGROUND OF THE INVENTION

When conventional switches and routers receive input data, they must examine the contents of the input data stream to determine where to direct the data. In order to find the relevant switching and routing information within the stream of data, frames and cells in the data must be identified (i.e. "delineated") and packets must be extracted from their digital "envelope" via a process known as "decapsulation." Decapsulation is performed in conventional switches and routers by software that executes on a processor. Software directs the decapsulation to ensure that the decapsulation is performed properly.

The data must be re-encapsulated after it has been decapsulated so that it may be sent out of the switch or router in the digital envelope required by the outgoing link. In conventional routers the re-encapsulation is performed by software that executes on a processor.

SUMMARY OF THE INVENTION

Conventional routers perform decapsulation and encapsulation somewhat slowly. The slowness of conventional routers is attributable in part to the encapsulation and decapsulation being performed by software. The present invention addresses this limitation by performing the decapsulation and encapsulation in hardware. In one embodiment of the present invention, a first ASIC contains the intelligence for performing decapsulation and another ASIC contains the intelligence for performing encapsulation. This results in heightened speed for both decapsulation and encapsulation.

The present invention also does not tie the encapsulation of data that is output to the encapsulation of the data as input. Instead, there is independence between the encapsulation of data input and the encapsulation of data as output. The decapsulation occurs upon a per tributary or per "virtual channel" basis. Similarly, the encapsulation is performed per virtual channel or tributary. As a result, the encapsulation that is output may differ from the encapsulation that is input.

In accordance with one aspect of the present invention, a hardware device is found in a forwarding node for directing data towards a destination. The hardware device includes an input port for receiving data encapsulated in one of multiple formats from a source. The forwarding node also includes decapsulation logic for decapsulating the data into packet format used in the forwarding node without executing processor instructions.

In accordance with another aspect of the present invention, a hardware device is found in a forwarding node for directing data towards a destination and includes an port for outputting data to the destination. The hardware device also includes encapsulation logic for encapsulating the data in a format that is required by the destination using a programmable patent insertion.

In accordance with an additional aspect of the present invention, a forwarding node directs data from a source towards a destination. The forwarding node includes a decapsulation logic for decapsulating the data based on the source and encapsulation logic for encapsulating the data base to the destination independent of the source.

In accordance with a further aspect of the present invention, a method is practiced in the forwarding node that is a hardware device for performing decapsulation for directing data from a source to a destination. Per this method, the data is received at the forwarding node and the source of the data is determined. The hardware device is employed to decapsulate the data based on the source of the data.

In accordance with an additional aspect of the present invention, data to be encapsulated and output from a forwarding node toward a destination is provided. The destination is determined and the data is encapsulated by a hardware device and a format that is proper for the destination based upon the destination.

In accordance with yet another aspect of the present invention, a hardware device includes an input port for receiving data encapsulated, one of multiple formats from a source. The hardware device also includes decapsulation logic for decapsulating the data into a packet format used in a forwarding node using a pattern matching technique.

BRIEF DESCRIPTION OF THE DRAWINGS

An illustrative embodiment of the present invention will be described below relative to the following drawings.

DETAILED DESCRIPTION OF THE INVENTION

Figure 1:
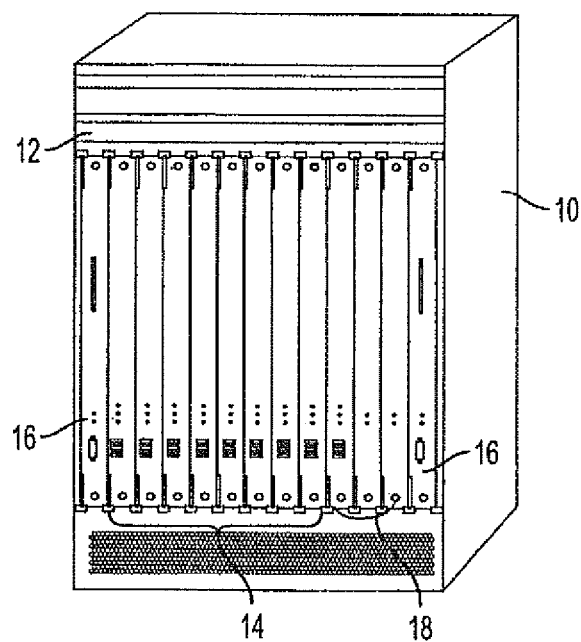
FIG. 1 depicts a switching shelf for use in the illustrative embodiment of the present invention.

The illustrative embodiment of the present invention provides a single integrated system for switching, forwarding and/or routing data in a multitude of different possible encapsulations. The system decapsulates incoming data and converts the data into a canonical format. The canonical format is used to transmit the data internally until the transmit side of the device is, reached. The transmit side is capable of a wide range of different encapsulations. The transmit side encapsulates the data received in the canonical format to create the appropriate encapsulation for the output port. The decapsulation and encapsulation are performed in hardware. The decapsulation uses pattern matching and the encapsulation uses pattern insertion. In the illustrative embodiment, application specific integrated circuits (ASICs) are used to perform the decapsulation and encapsulation. The use of the hardware provides added speed in performing the operations of decapsulation and encapsulation.

The decapsulation and encapsulation rely upon per virtual circuit information. Based upon what virtual circuit a piece of data arrived on, an encapsulation for the virtual circuit may be determined and used to perform decapsulation. Similarly, the re-encapsulation of data is performed on a per virtual circuit basis based on the virtual circuit onto which the data is being output and the re-capsulation is independent of the virtual circuit on which the data arrived. For purposes of the present context, the virtual circuit refers to a communication link that appears to a user to be a dedicated point to point circuit. Virtual circuits may also be referred to as "channels" or "interfaces" in the discussion below.

The illustrative embodiment of the present invention provides a single integrated system for performing both Internet Protocol (IP) forwarding/routing and asynchronous transfer mode (ATM) switching/routing. The single device contains both an IP packet forwarding facility and an ATM switching facility. In this context, "forwarding" refers to the passing of packets between a source port and one or more destination ports in a communication node, such as a switch, a router or a switch/router. "Routing" refers to the accumulation of topology information to provide information to a forwarding table the accumulation of topology information to provide information to a forwarding table or similar structure by a communication node that is used for directing input data toward a destination. "Switching" refers to the directing of packets or other modularized information through intermediary switching nodes to connect a sender with a receiver in a connection-oriented environment.

The illustrative embodiment eliminates the need for having separate switches and routers. The device employed in the illustrative embodiment can handle both ATM cells and IP packets in a single device and also can handle IP packets carried by ATM cells. The illustrative embodiment can direct data encapsulated in a wide variety of encapsulations. The system of the illustrative embodiment may be employed in IP networks, such as the Internet, an intranet or an extranet, or more traditional switching environments, such as virtual private networks (VPNs), and private data networks. The system supports routing of IP packets over a SONET (Synchronous Optical Network), the routing of IP packets over ATM and pure ATM switching amongst other encapsulations. More generally, the illustrative embodiment eliminates the separation between layer 2 devices and layer 3 devices so that layer 2 data units and layer 3 data units may be directed toward their destinations by a single integrated system.

The illustrative embodiment employs a switch/router suitable for use in a communications network such as a computer network or a telephone network. More severally, the present invention may be practiced with a forwarding node, such as a router, switch, computer system or other device that can implement the methods of the present invention. The switch/router includes input ports for receiving input data traffic and output ports for directing the input data traffic towards destinations. Each input data port is tied to a communications line, such as a fiber optic line. Similarly, each output port is tied, likewise, to a communication line (e.g. a fiber optic line). An ATM cell forwarding facility and an IP packet forwarding facility are provided for each input port. The ATM cell forwarding facility determines, for each ATM cell received by the input port, which output port to use for outputting the ATM cell. The IP packet forwarding facility determines, for each IP packet received by the input port, which output port to use for outputting the IP packet. Hence, each input port may receive both ATM cells and IP packets and the switch/router will properly direct the ATM cells and IP packets.

The discussion below summarizes the architecture and operation of the switch/router device of the illustrative embodiment.

FIG. 1 depicts a switching shelf 10 that is suitable for use in the switch/router device of the illustrative embodiment. The switching shelf 10 provides core switching functionality for the device. As will be explained in more detail below, the device may include multiple switching shelves to increase the switching capacity of the device. This modularizing of the switching functionality allows a network provider to choose the switching capacity that is appropriate for the needs of the network provider. The switching shelf 10 includes a housing 12 for holding the components of the switching shelf, including eight line cards 14. The eight line cards 14 are printed circuit boards that contain the intelligence for receiving and transmitting data. Each line card 14 is designed to receive/transmit an OC-48 input stream, corresponding to 2.488 gigabits per second (Gbps). SONET is a standard that defines a family of fiber optic transmission rates that facilitate the internetworking of transmission products for multiple vendors. SDH is a standard that is technically consistent with SONET. The optical transmission rates are known as optical carry (OC) rates. The SONET/SDH OC rates are defined as follows:

| OC Level | Line Rates | Capacity |
|---|---|---|
| OC-1 | 51.84 Mbps | 28 DS1s or 1 DS3 |
| OC-3 | 155.52 Mbps | 84 DS1s or 3 DS3s |
| OC-9 | 466.56 Mbps | 252 DS1s or 9 DS3s |
| OC-12 | 622.08 Mbps | 336 DS1s or 12 DS3s |
| OC-18 | 933.12 Mbps | 504 DS1s or 18 DS3s |
| OC-24 | 1.244 Gbps | 672 DS1s or 24 DS3s |
| OC-36 | 1.866 Gbps | 1008 DS1s or 36 DS3s |
| OC-48 | 2.488 Gbps | 1344 DS1s or 48 DS3s |
| OC-96 | 4.976 Gbps | 2688 DS1s or 96 DS3s |
| OC-192 | 9.953 Gbps | 5376 DS1s or 192 DS3s |

As can be seen in the above-identified table, OC-48 is one of the specified line rates. In the "Capacity" column of the table, references are made to DS-1 and DS-3 rates. These are SONET/SDH capacities expressed in terms of the line rates in the Plesiochronous Digital Hierarchy (PDH) of digital signal speeds that is used to classify capacities of lines or trunks. The fundamental speed level in the PDH is DS-0, which corresponds to 64 kilobits per second. DS-1 corresponds to 1.54 megabits per second, and DS-3 corresponds to 44.736 mbps.

The switching shelf 10 also contains switching module cards 18 that occupy three slots. Switching module cards 18 are printed circuit boards that provide switching capacity to facilitate communication between line cards. The switching module cards 18 form the core of the "interconnect," which will be described in more detail below. Switch resource modules 16 occupy the remaining two slots in the switching shelf 10. These modules 16 manage board level status information for the switching shelf 10.

Figure 2:
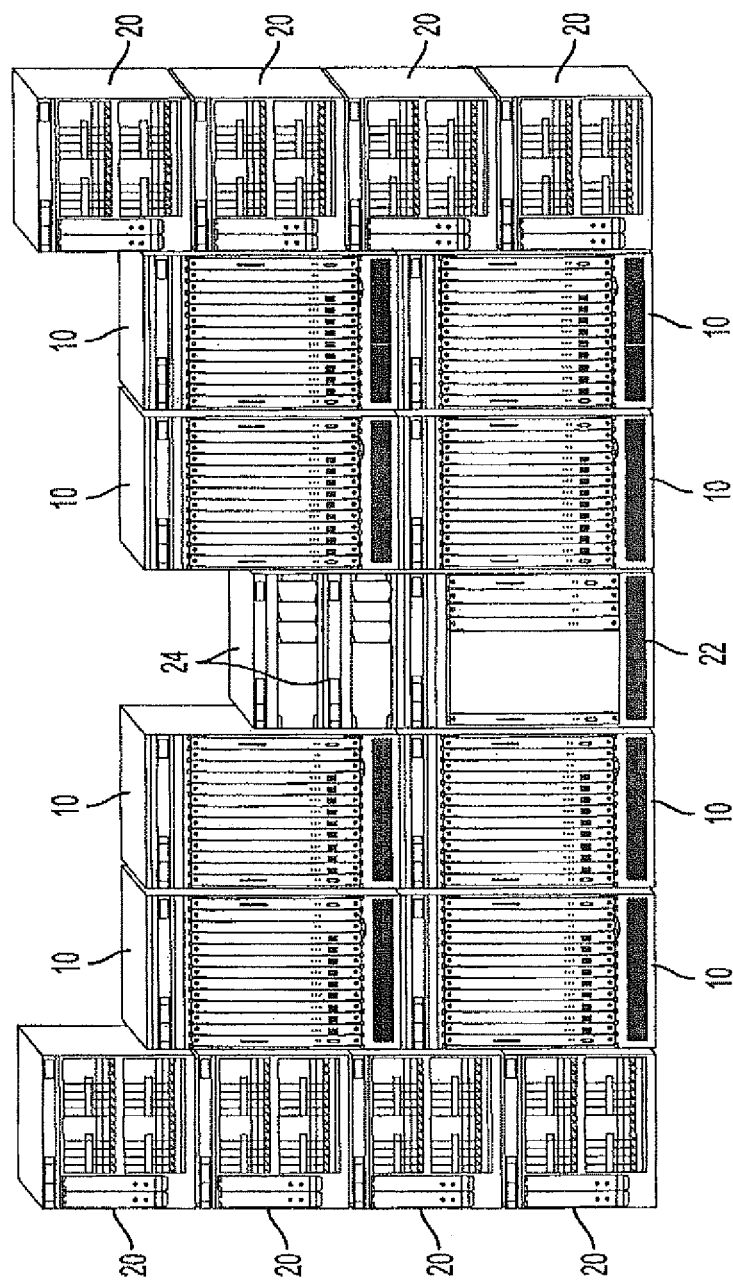
FIG. 2 depicts an implementation of the device of the illustrative embodiment in which multiple switching shelves are employed.

As was mentioned above, additional switching shelves 10 may be employed in the device to increase the switching capacity of the device. FIG. 2 shows an example wherein eight switching shelves 10 are employed. Access shelves 20 are also employed in the device. Each access shelf 20 has a pair of linear terminal multiplexers that create a structured OC-48 data stream from individual OC-12, OC-3, DS-3 and/or E3 tributaries. In the example depicted in FIG. 2, eight access shelves 20 are employed. An access shelf 20 is provided for each corresponding switching shelf 10. The device also contains a number of control shelves 24. Each control shelf 24 contains a dual redundant pair of processors: on active processor and a standby processor. Extension shelf 22 is a 160 Gbps switch for interconnecting up to eight switching shelves 10. The extension shelf 22 allows an input data stream to be received on a line card in a first of the switching shelves 10 and output from a line card on a second of the switching shelves.

Figure 3:
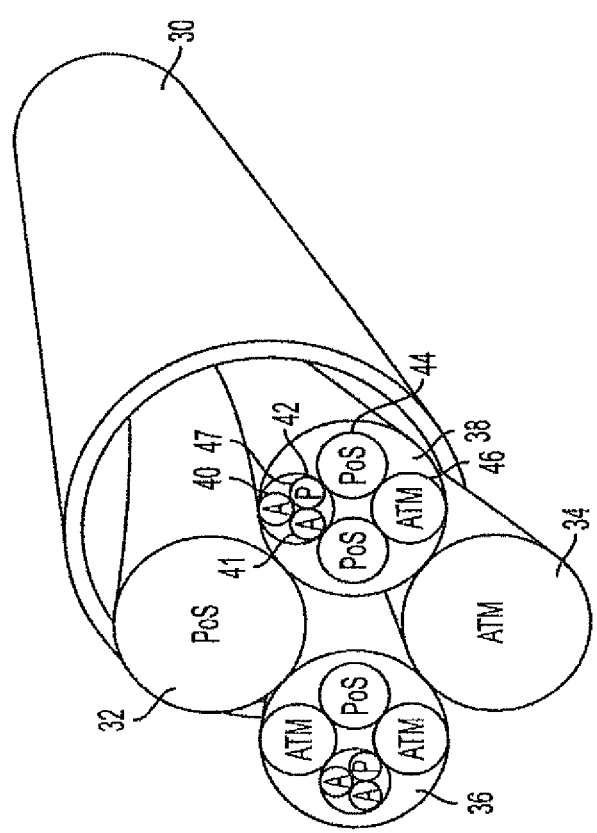
FIG. 3 depicts the channelized SONET scheme used in the illustrative embodiment.

The device of the illustrative embodiment provides a channelized SONET/SDH mode of operation, such that each OC-48 line card module can be configured for DS-3, OC-3 and OC-12 or OC-48 tributary configuration. FIG. 3 shows an example of such channelization. A single OC-48 input stream 30 has tributaries that include an OC-12C packet over SONET tributary 32 and an OC-12 ATM tributary 34. The OC-48 input stream 30 also includes tributary 38 which is divided into four OC-3 tributaries including OC-3C packet over SONET tributary 44 and an OC-3C ATM tributary 46. Tributary 38 also contains tributary 47, which is divided into three DS-3 tributaries, including an OS-3 ATM tributary 40 and an ATM HEC delineated tributary 40, a DS-3 ATM PLCP delineated tributary 41 and a PPP over DS-3 tributary 42. Each on the line card modules 14 demultiplexer the OC-48 input stream into the specified tributaries and then operates on the tributaries (i.e. "channels") separately. The configuration of the tributaries may be dynamically altered.

Figure 4:
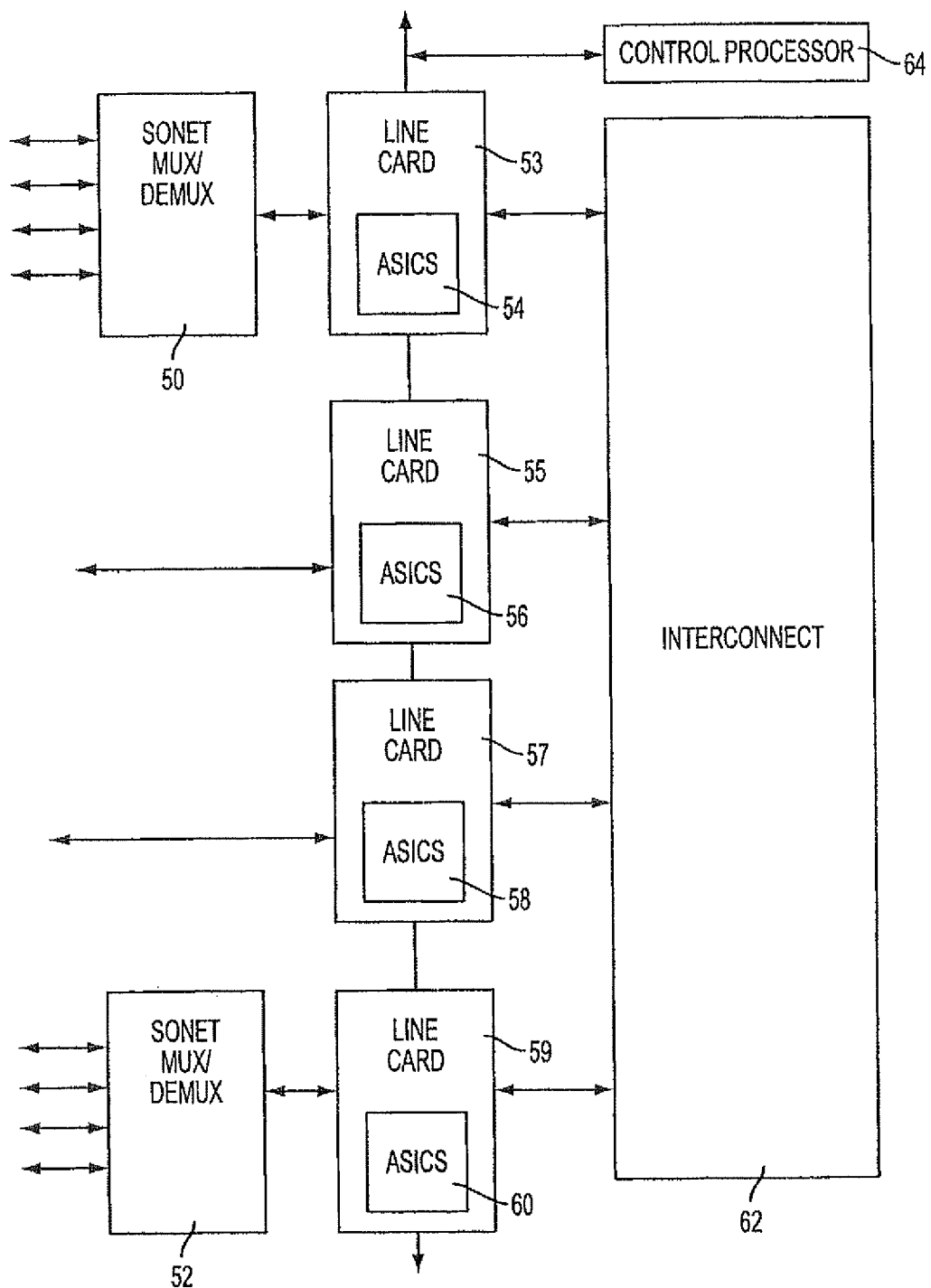
FIG. 4 depicts multiplexers and a switching shelf with four line cards.
Figure 5:
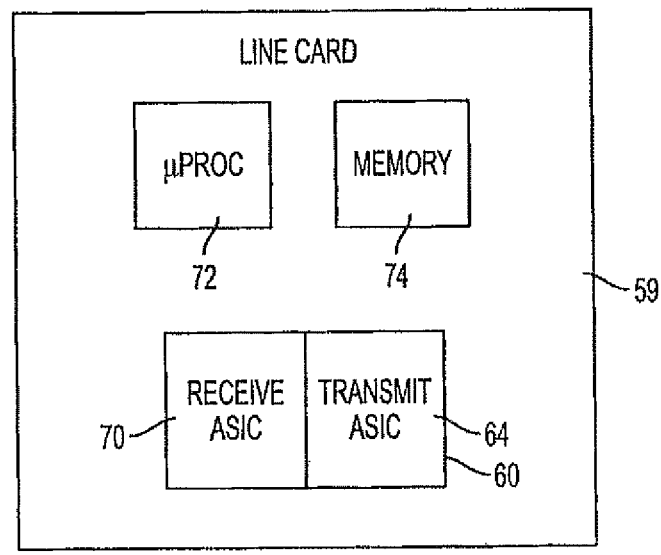
FIG. 5 depicts components of a line card in more detail.

FIG. 4 illustrates an example of the portion of the functional layout for the receive side of the device of the illustrative embodiment. The device includes line cards 53, 55, 57 and 59 that are coupled to input communication lines. Each line card 53, 55, 57 and 59 receives a single physical OC-48 data stream via an input port. FIG. 5 depicts some additional components found on the line card 59. Each of the other line cards 53, 55, and 57 is presumed to have a similar layout. The line card 59 includes a microprocessor 72 and a memory 74. The memory 74 may take many different forms including random access memory (RAM) or read only memory (ROM). The line card 59 includes application specific integrated circuits (ASICs), including a receive ASIC 70 and a transmit ASIC 64. The receive ASIC 70 is responsible for receiving incoming data and processing the data so that the data is ready to be transferred over the interconnect 62. The transmit ASIC 64 receives data from the interconnect 62 and forwards data out over an output port to an output line. As mentioned above each of the line cards 53, 55 and 57 has a similar architecture to that depicted in FIG. 5. Hence, line card 53 includes ASICs 54, line card 55 includes ASICs 56 and line card 57 includes ASICs 58.

Those skilled in the art will appreciate that the depiction of the line card 59 shown in FIG. 5 is considered to be merely illustrative and not limiting the present invention. Other line card configurations may be used to practice of the present invention. Moreover, the functionality provided by each of the line card needs not be implemented on a line card per se but rather may be implemented in a different fashion or by a different hardware configuration. In addition, the receive ASIC 70 and the transmit ASIC 64 need not be implemented as two separate ASICs but rather may be implemented as more that two ASICs or as a single ASIC.

The line cards 53 may have SONET multiplexers, such as multiplexers 50 and 52 positioned at the input of the input ports for the line cards to multiplex the incoming tributary data streams into OC-48 data streams. In the example depicted in FIG. 4, SONET multiplexer 50 multiplexes 4 OC-12 data streams into an OC-48 data stream. Demultiplexers 50 and 52 are positioned at the feeds into the output ports to take OC-48 from the line card and splitting it into constituent tributaries, such as OC-12, OC-3 or OS-3 tributaries. Control processor 64 control oversees operation of the line cards and 53, 55, 57 and 59 interconnect 62.

An example is helpful to illustrate data flow through the components depicted in FIG. 4. Suppose that four OC-12 data streams are multiplexed into a single OC-48 input data stream at the input port for line card 59. The receive ASIC 70 on line card 59 decapsulates the data and determines how to direct the data in the input data stream. The data is passed over the interconnect 62 to a destination line card, such as line card 53. The transmit ASIC 64 on the line card 53 packages the data (i.e. encapsulates) in a format that is appropriate for the destination. The data is then sent out over the output ports. A multiplexer 50 may multiplex the output data from the OC-48 stream coming out of the line card onto a physical OC-12 port.

Figure 6:
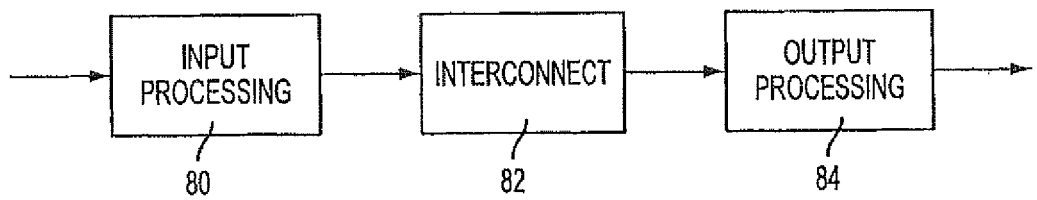
FIG. 6 depicts the three primary stages of processing performed on input traffic.

FIG. 6 depicts the three primary stages involved in processing an input data stream with the device. Initially, input processing 80 is performed. As will be described in more detail below, the input processing locates ATM cells and IP packets within the incoming data stream and 80 decapsulates and segments the incoming packet data. The input processing 80 places the data in a suitable format to direct the data over the interconnect 62. IP forwarding and ATM switching lookups are performed as part of the input processing 80. The interconnect stage 82 directs the input data over the interconnect 62 to the appropriate output line card or cards. Output processing 84 involves encapsulating the data received over the interconnect and directing the data out of the appropriate output ports so that the data reaches the intended destinations. The discussion below will describe these stages in more detail.

Figure 7:
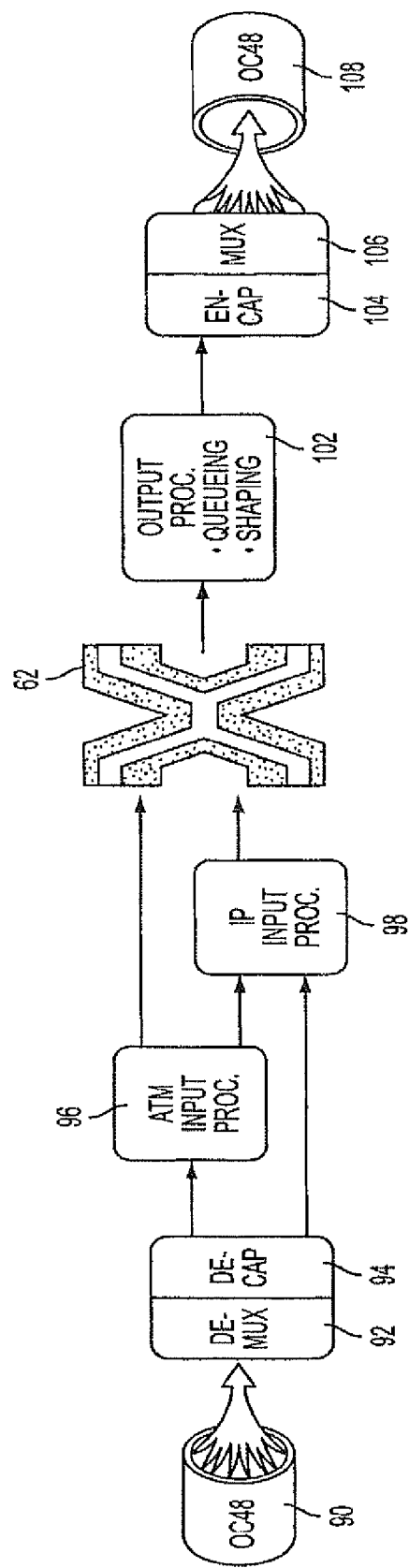
FIG. 7 is functional diagram illustrating steps performed on data traffic.

FIG. 7 provides a functional diagram that exhibits the lifetime of processing from input to output for a given data stream in the illustrative embodiment. The OC-48 input data stream 90 is first demultiplexed 92 into the separate tributaries (also known as "channels" or "virtual circuits"). The data within each of the SONET frames and carried on SONET sub-channels is separated and the Point to Point Protocol (PPP) frames, Frame Relay (FR) frames and ATM cells are "delineated." Subsequently, packets are decapsulated 94. The packets are decapsulated using a pattern matching technique in which patterns are stored in a programmable pattern storage and used to identify how the decapsulate enveloped holding data. ATM input processing 96 is performed on ATM cells in the input data and IP input processing 98 is performed on IP packets in the input data. Data passes over the interconnect 62 to an output line card. The output line card performs output processing 102, which includes queuing and traffic shaping 102. Encapsulation 104 is performed on the data and the respective tributaries are multiplexed 106 to produce an OC-48 output data stream 108. The encapsulation uses programmable pattern insertion techniques where patterns from a programmable pattern storage are inserted with data to create the proper encapsulation.

The illustrative embodiment leverages the infrastructure of SONET/SDH to support multiple data encapsulations. It is presumed that all incoming data is received within SONET frames. Additional types of frames and cells may be contained within the SONET frame.

Figure 8:
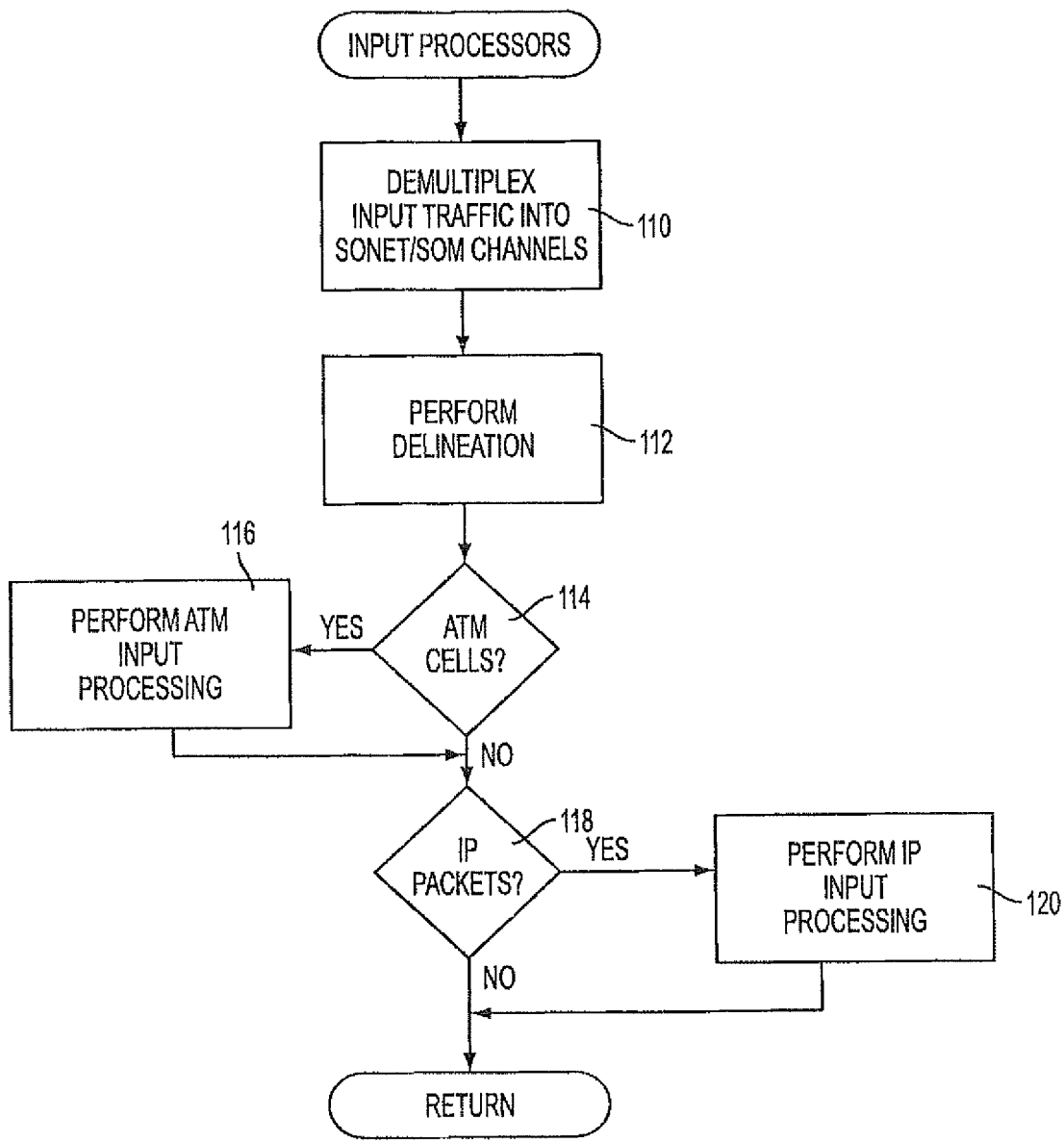
FIG. 8 is a flowchart illustrating the steps that are performed during input processing.
Figure 9:
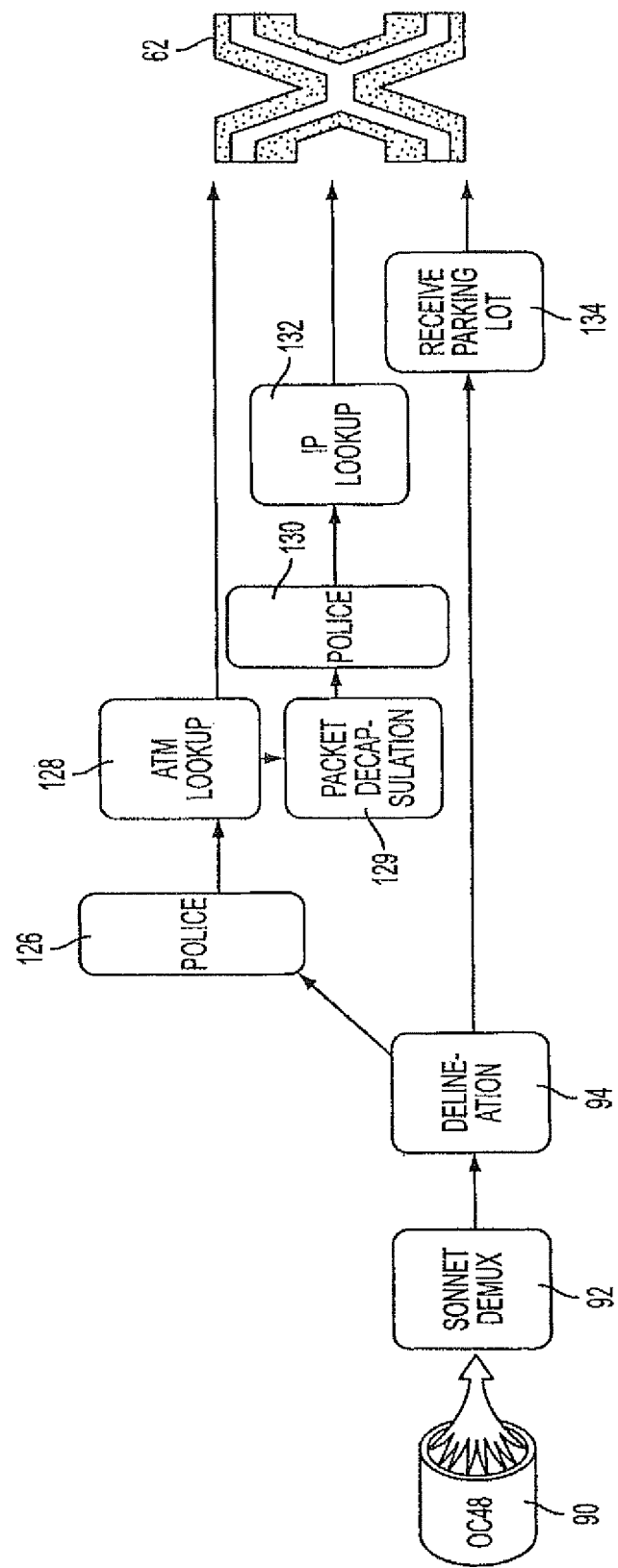
FIG. 9 is a functional diagram illustrating functional steps performed during input processing.

FIG. 8 is a flowchart that illustrates the steps that are performed during input processing in the illustrative embodiment. Initially, the incoming data must be demultiplexed into the respective SONET/SDH tributaries or channels. (step 110 in FIG. 8). Input processing is in effect performed on all of the tributaries simultaneously. FIG. 9 depicts a functional diagram of the input processing (which is more detailed than the diagram of FIG. 7). Initially OC-48 data stream 90 is logically demultiplexed by SONET demultiplexers 92 into respective tributaries.

The data in the respective tributaries may be in any of a number of different formats. The receive ASIC 70 delineates this data (step 112 in FIG. 8) to gain access to the ATM cells, PPP frames or FR frames carried therein (see 94 in FIG. 7). Each IP packet may be composed of multiple ATM cells or may be contained in a PPP frame or FR frame.

The various types of frames that may be found in the data will be described in more detail below. In addition, the techniques used to perform the delineations will also be described in more detail below. In some instances it may be also necessary to locate a packet within a frame during decapsulation so that the packet may IP routed (forwarded). Such a packetization will be described in more detail below on a case by case basis.

Figure 11:
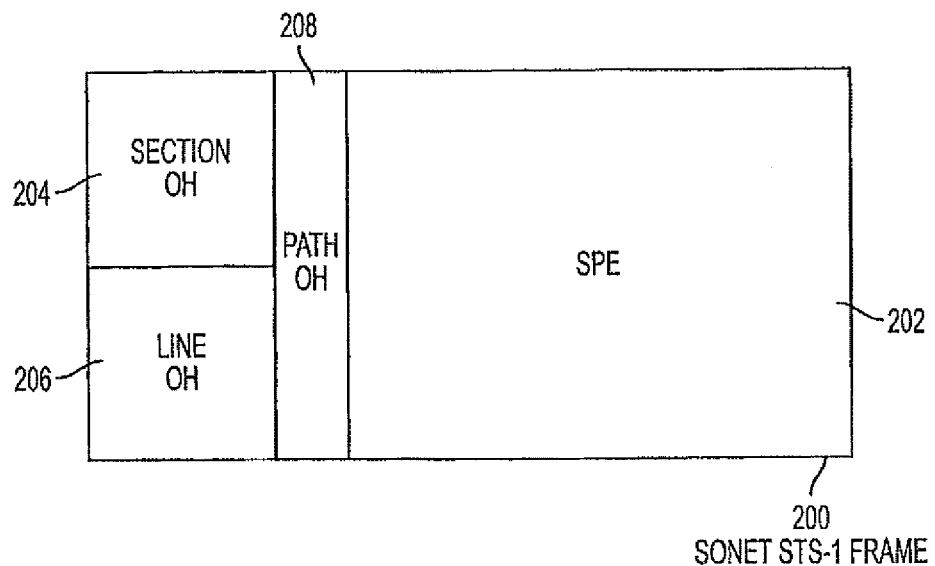
FIG. 11 illustrates the logical format of a SONET STS-1 frame.

FIG. 11 depicts the format of a SONET STS-1 frame (OC-1) 200. Other SONET frame formats may be used to support OC-3, OC-12 and OC-48. The SONET frame 200 includes 9 rows, each row containing 90 Octets (i.e. 90 8-bit bytes). The payload for the SONET frame 200 is contained in the synchronous payload envelope (SPE) 202. The SPE 202 contains 9 bytes that are dedicated to path overhead (OH) 208. The SONET frame 200 also contains section OH 204 and line OH 206. The section OH 204 and line OH 206 are part of the SONET transport overhead. In this context, "overhead" refers to header information that is provided for use by various layers of the computer network.

Figure 10:
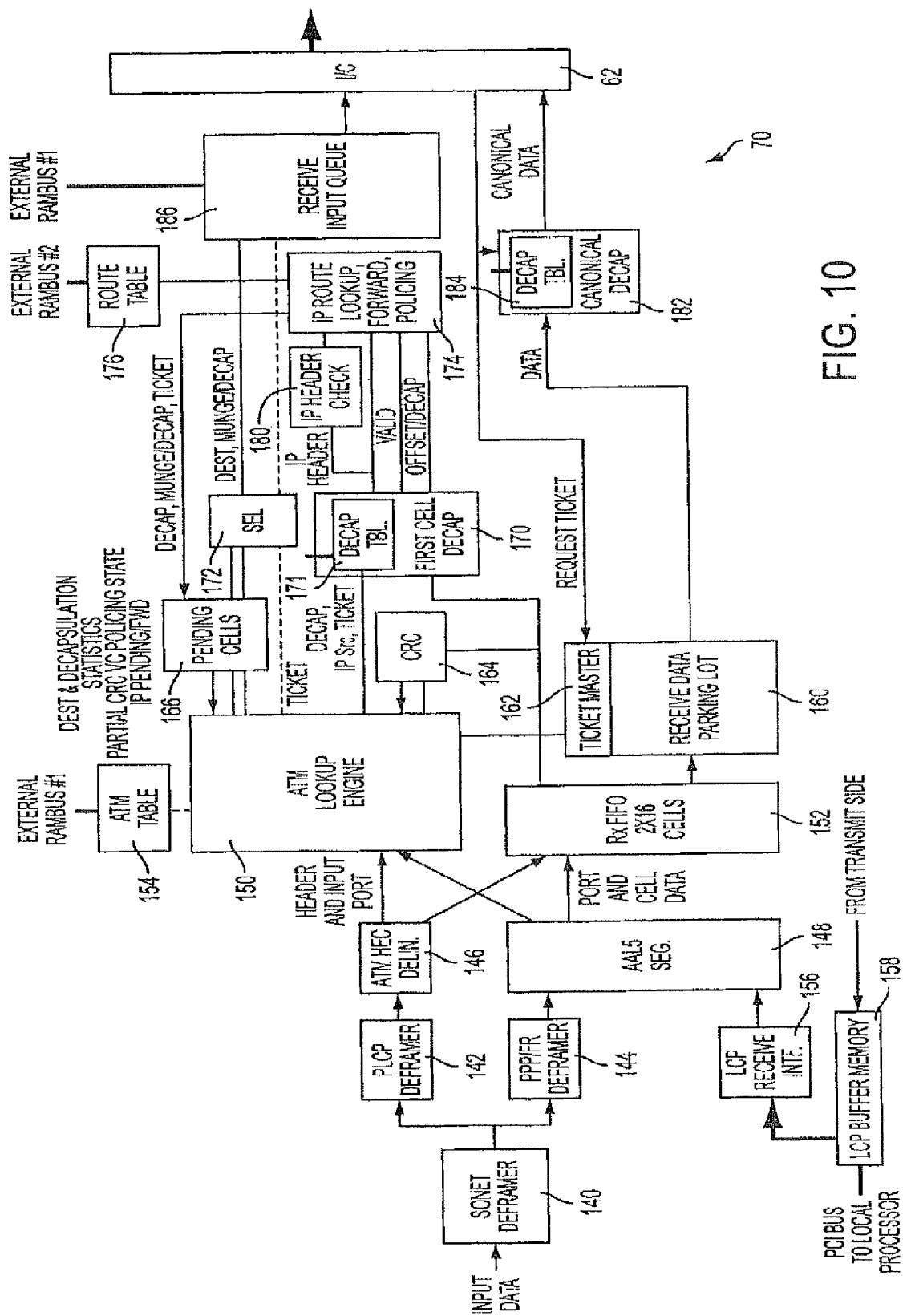
FIG. 10 is a more detailed block diagram of the receive ASIC 70 of FIG. 5.
Figure 12:
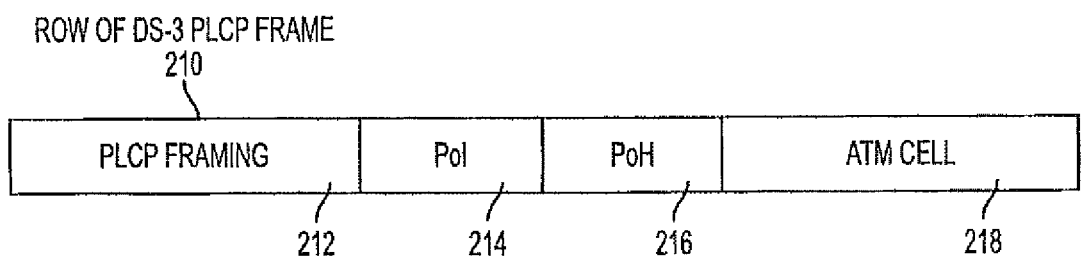
FIG. 12 illustrates the logical format of a row of a DS-3 PLCP frame.

FIG. 10 depicts the components of the receive ASIC 70 in more detail. The receive ASIC 70 includes a SONET deframer 140 that receives the input data. The SONET deframer 140 removes the contents of the SPE 202 from the SONET frame 200. The resulting payload may contain additional frames, as will be described in more detail below. One possibility is that the payload of the SONET frame 200 contains one or more DS-3 PLCP (Physical Layer Convergence Protocol) frames. Such a frame holds a payload that is used in mapping ATM cells onto DS-3 facilities. The frame includes twelve rows like the row 210 shown in FIG. 12. Each row includes PLCP framing Octets (A1 and A2) 212 to identify the framing pattern that is utilized. The path overhead indicator (POI) 214 indexes the adjacent path overhead (POH) octet 216 and identifies the encoding for the POH octet. The ATM cell 218 holds the data content for the frame 210, and the frame may include trailer nibbles (i.e. 4-bits).

Figure 13:
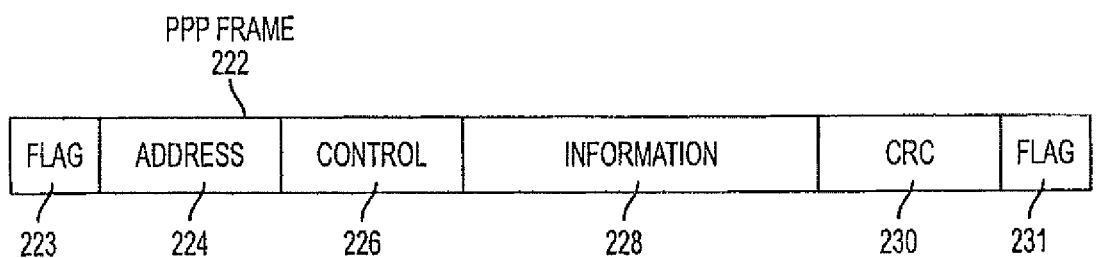
FIG. 13 illustrates the logical format of a PPP frame.

The data may also be encapsulated in a PPP frame 222, such as shown in FIG. 13. PPP is a layer two protocol that is built on top of a restrictive subset of the standard 223 and 231. Each PPP frame 222 includes an address 224 and a control field 226 for holding flow control information. The PPP frame 222 contains an information section 228 and a PPP payload. The CRC field 230 identifies the variety of cyclic redundancy check that is used for the frame.

Figure 14:
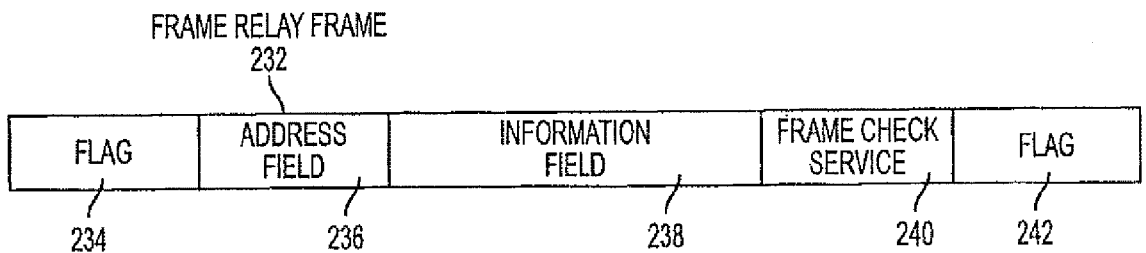
FIG. 14 illustrates the logical format of a frame relay frame.

The data may be encapsulated in an FR frame 232 (FIG. 14). Each FR frame 232 is bracketed a byte of flag information 234. The FR frame begins with an address field 236 in the FR frame header. The FR frame 232 also contains an information field 238 that holds a payload and is terminated with a frame check sequence octet 240 that holds information used to check whether the frame is properly received. Lastly, the frame relay frame 232 has a flag octet 242 at the end of it.

Figure 15:
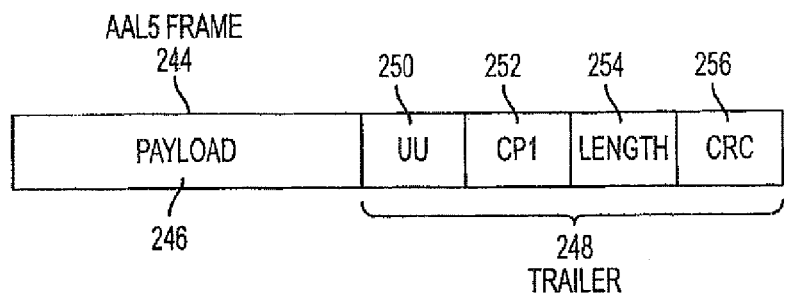
FIG. 15 illustrates the logical format. Of an AAL5 IDU.

FIG. 15 depicts the format of an AAL5 frame 245. The frame 245 contains a payload 246 that may hold multiple ATM cells and a trailer 248. The frame 245 may be of variable length. The trailer 248 contains the user-to-user (UU) field 250, which holds data that is to be transferred transparently between users. A common part indicator (CPI) field 252 aligns the trailer in the total bit stream. The length field 254 indicates the length of the total payload 246. A cyclic redundancy check (CRC) field 256 is used for error detection over all of the payloads of all the cells that comprise the AAL5 frame. The entire set of data contained in frame 245 is segmented into 48 octet payloads prepended with a 5 octet header to form 53 octet ATM cells.

One of the first steps of the decapsulation is to perform delineation. Delineation is the mechanism by which a data stream is organized into validated frames of cell by inspection of the bits and bytes within the data stream. The illustrative embodiment supports the following delineation:

1. ATM cell delineation within SONET payloads by header error control (HEC) recognition.
2. ATM cell delineation within DS-3 payloads by physical layer conversion protocol (PLCP).
3. Point to point protocol (PPP) frame delineation within SONET payloads by octet synchronous high level data link control (HDLC) with CRC32 or CRC16.
4. PPP frame delineation with DS-3 payloads by bit synchronous HDLC with CRC32 or CRC16.
5. PPP frame delineation carrying Multiprotocol label switching (MPLS).
6. Frame relay frame delineation with SONET payloads by octet synchronous HDLC with CRC16.

7. Frame relay frame delineation within DS-3 payloads by bit synchronous HDLC with CRC16.

8. Frame relay frame delineation carrying MPLS.

Figure 16:
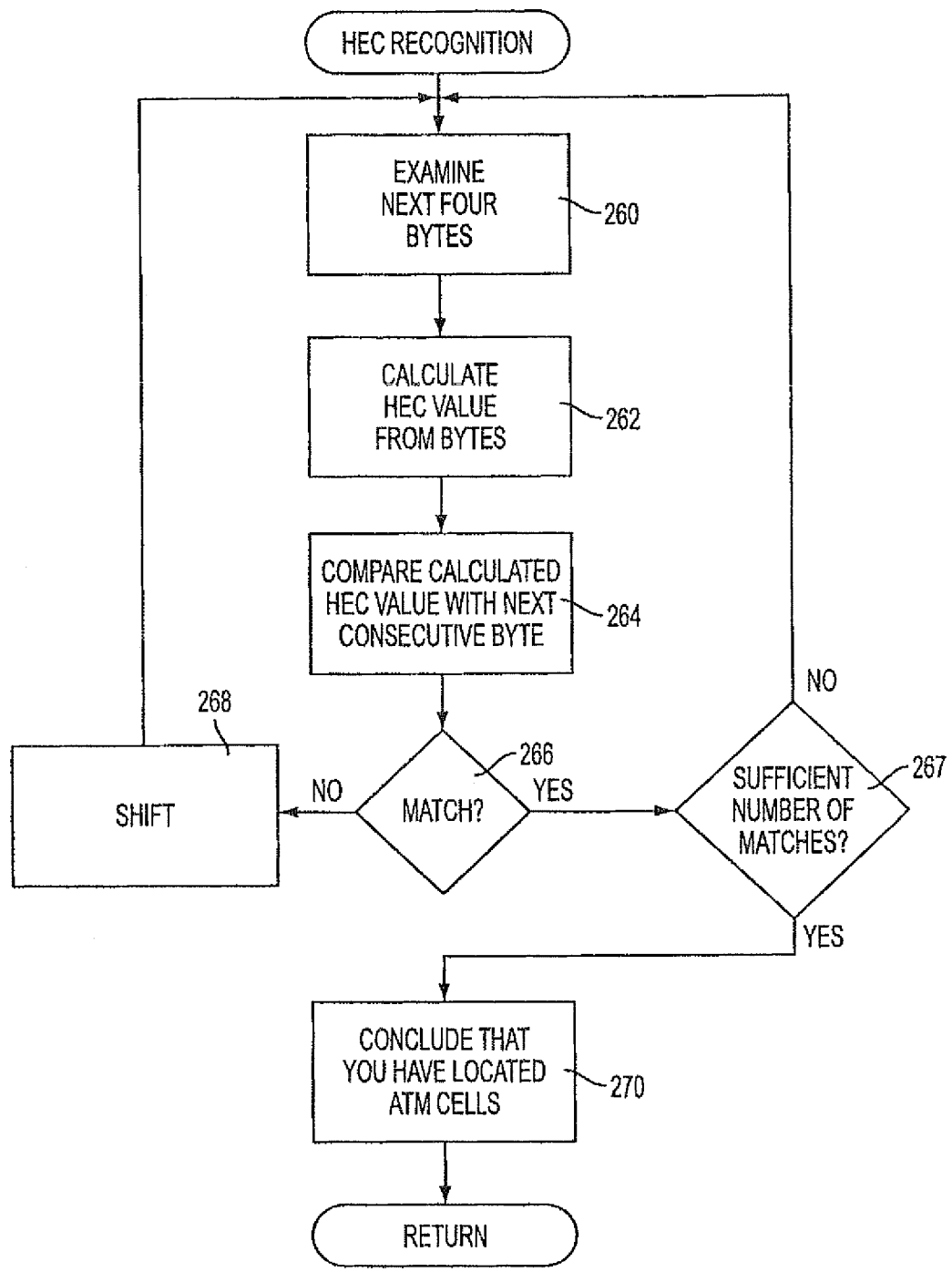
FIG. 16 is a flow chart illustrating the steps that are performed to delineate ATM cells using HEC recognition.

With the first delineation listed above, HEC recognition is used to locate ATM cells within a SONET payload. Each ATM cell includes a HEC byte that is calculated as a cyclical redundancy check of the first four bytes of the header. The HEC byte is used to determine whether the beginning of an ATM cell has been found. FIG. 16 is a flow chart illustrating the steps that are performed with such a delineation. Initially, the first four bytes in the SONET payload are examined (step 260 in FIG. 16). A HEC value is then calculated for the four bytes (step 262 in FIG. 16). The calculated HEC value is compared with the byte that follows the first four bytes (step 264 in FIG. 16). If there is a match (see step 266 in FIG. 16), it is a fairly strong indication that an ATM cell has been located. If a sufficient number of matches in a row have been found (step 267 in FIG. 16), it may be concluded that ATM cells have been located (step 270 in FIG. 10). As will be described in more detail below, once and ATM cells has been identified, the header may be stripped from the cell and the payload may be delivered. If there is not a match (see step 266 in FIG. 16), the process shifts a byte down or a nibble down (in the DS-3 non-PLCP case) in the stream of data for each sub-channel (step 268 in FIG. 16) and repeats the above described steps beginning with step 260 of FIG. 16.

Figure 17:
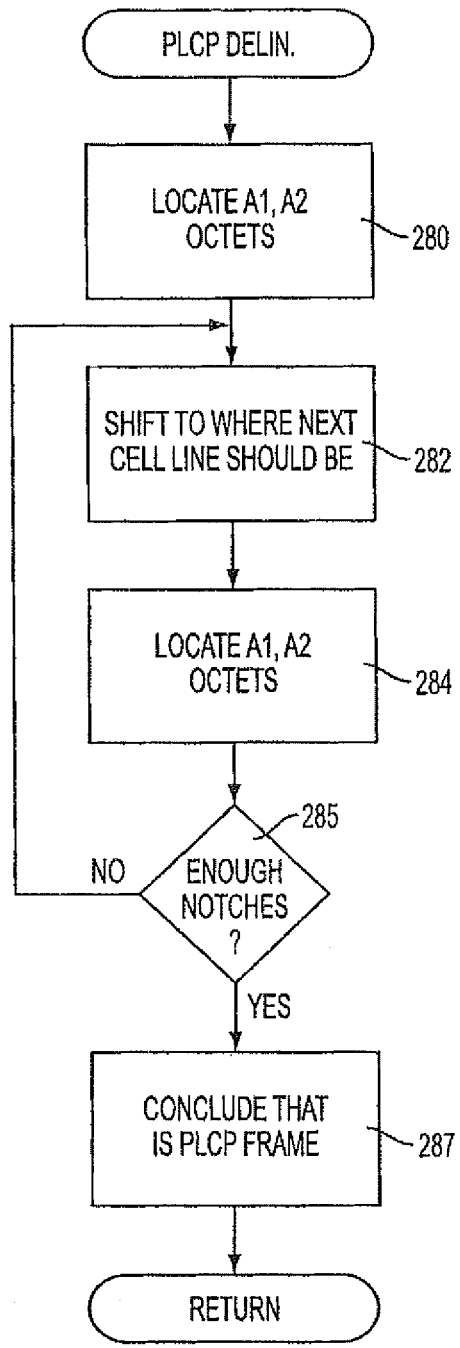
FIG. 17 is a flow chart illustrating the steps that are performed to delineate a PLCP frame and hence, to delineate ATM cells in the PLCP frame.

In some instances, the ATM cells may lie within a DS-3 PLCP frame. In such instances, a different approach to delineation must be used. As shown in FIG. 17, for such instances, the A1 and A2 framing octets of the PLCP frame (see "PLCP Framing" 212 in FIG. 12) are located (step 280 in FIG. 17). These framing octets have fixed values. Specifically, the A1 framing octet has a value of "11110110," and the A2 framing octet has a value of "00101000." The process shifts to where the next cell line should be (i.e. 57 bytes with 53 bytes due to the ATM cell and 4 bytes due to overhead) (step 282 in FIG. 17) and the A1 and A2 octets are located (step 284 in FIG. 17). Once such bytes have been located (the remainder of the cell line is fixed size), then if N consecutive PLCP cell lines are found (see step 285 in FIG. 17) it is presumed that a PLCP frame has been found (step 287 in FIG. 17). The location of the ATM cells within the PLCP frame is fixed and known. Thus, the ATM cells may be clearly delineated.

Figure 18:
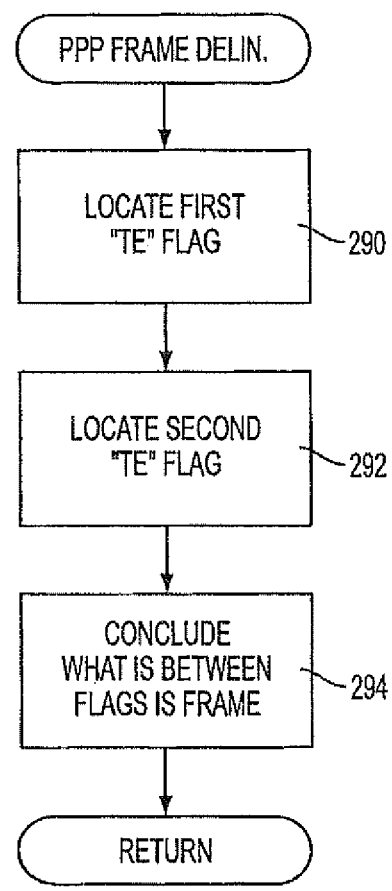
FIG. 18 is a flow chart illustrating the steps that are performed to delineate a PPP frame.

The third, fourth and fifth delineations identified above relate to delineating PPP frames. PPP frames are transmitted with a "7E" flag at the beginning and the end. Hence, the PPP frame may be located by first locating the initial "7E" flag (step 290 in FIG. 18). Subsequently, the second "7E" flag that trails the frame is located (step 292 in FIG. 18). A conclusion is then reached that what is between the flags constitutes a PPP frame (step 294 in FIG. 18).

PPP may employ multiple framing techniques for use with different media. Two of these framing techniques are bit synchronous HDLC and octet synchronous HDLC. Thus, the third delineation concerns the instance where octet synchronous HDLC is used and the fourth delineation instance concerns when bit synchronous HDLC is used. The fifth delineation deals with an instance wherein the PPP frame includes MPLS information. The MPLS information is sub-channel information that is contained within the PPP frame.

Figure 19:
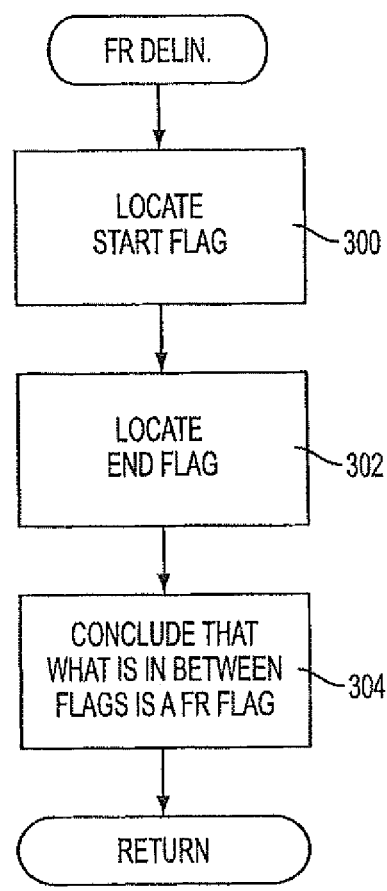
FIG. 19 is a flow chart illustrating the steps that are performed to delineate a frame relay frame.

The fifth, sixth, seventh and eighth delineation set forth above all deal with frame relay frame delineation. FIG. 19 is a flow chart illustrating the steps that are performed to identify to delineate frame relay frames. Frame relay frames include a start flag and an end flag. The process of delineation for frame relay frames largely entails identifying these flags. The first step is to locate the start flag (step 300 in FIG. 19). Next, the end flag is located (step 302 in FIG. 19). If both the start flag and end flag are located, it may be concluded that what is in between the flag constitutes a frame relay frame (step 304 in FIG. 19).

Figure 20:
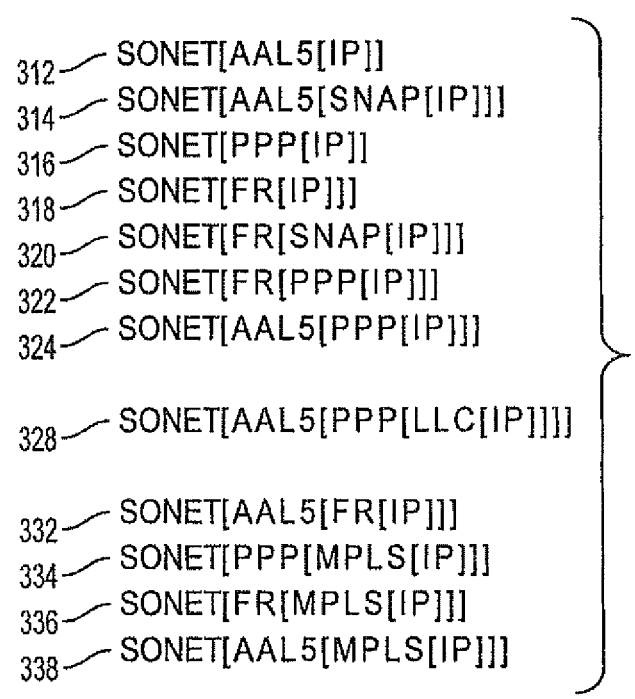
FIG. 20 illustrates encapsulations for IP packets that are expected by the illustrative embodiment.

The input data may have a number of different encapsulations. The illustrative embodiment seeks to locate IP packets within such encapsulations. For the ATM cells case, the ATM cells are delineated within the payload of the SONET frame and are located after deframing the SONET frame. The IP packet may however have much more complex encapsulations. FIG. 20 lists the encapsulations that are acceptable to the device of the illustrative embodiment for IP packets. The encapsulation 312 is an instance wherein IP is encapsulated within AAL5, which, in turn, is encapsulated within SONET. Encapsulation 314 is an instance wherein an IP packet is encapsulated within AAL5 that includes sub-network access protocol (SNAP) information. The AAL5 is encapsulated within SONET. Encapsulation 316 is an instance wherein IP is encapsulated within a PPP, which is encapsulated within SONET. Encapsulation 318 is an instance wherein IP is encapsulated within frame relay, which is encapsulated within SONET.

Encapsulation 320 is an instance wherein IP is encapsulated within frame relay and contains SNAP information. The frame relay is encapsulated within SONET. Encapsulation 322 is an instance wherein IP is encapsulated within PPP, which is encapsulated within frame relay, which, in turn, is encapsulated within SONET. This encapsulation 322 may be with or without protocol compression.

Encapsulation 324 is an instance wherein IP is encapsulated within PPP. The PPP is encapsulated within AAL5, which is encapsulated within SONET with or without protocol compression. The encapsulation 328 is an instance wherein IP is encapsulated within PPP that contains logical link control (LLC) information. The PPP is encapsulated within AAL5, which is encapsulated within SONET with or without protocol compression.

Encapsulation 332 is an instance wherein IP is encapsulated within frame relay. The frame relay is encapsulated within AAL5, and the AAL5 is encapsulated within SONET.

Encapsulation 334 is an instance wherein IP is encapsulated within PPP that contains MPLS information. The PPP is encapsulated within SONET.

Encapsulation 336 is an instance wherein IP is encapsulated within frame relay that includes MPLS information. The frame relay is encapsulated within SONET.

Lastly, encapsulation 338 is an instance wherein IP is encapsulated within AAL5 that holds MPLS information. The AAL5 is encapsulated within SONET.

Those skilled in the art will appreciate that additional encapsulations may be used at practicing the present invention. Moreover, not all of the encapsulations depicted in FIG. 20 are necessary to practice the present invention.

As part of the decapsulation (step 112 in FIG. 8), the ATM cells or IP packets are removed from the encapsulations frames. The receive ASIC 70 (FIG. 5) maintains interface information regarding the input port to which input data is received. The interface maintains a separate context for each tributary and the context identifies the nature of the tributary. Each tributary is a virtual circuit of sorts and context information regarding the expected encapsulation for the tributary is maintained. For encapsulations containing IP packets, the PPP/FR deframer 144 is enabled and the data is sent to the PPP/FR deframer 144. The deframer 144 includes a programmable pattern matching storage for use in decapsulation.

For encapsulations where ATM cells are to be extracted, the data follows a different route. If the ATM cells are to be delineated by HEC delineation, the ATM HEC delineator 146 is enabled and locates the ATM cells as described above. However, if the data contains a PLCP frame, PLCP deframer 142 is enabled and deframes the PLCP frame which contains the ATM cells.

Figure 21:
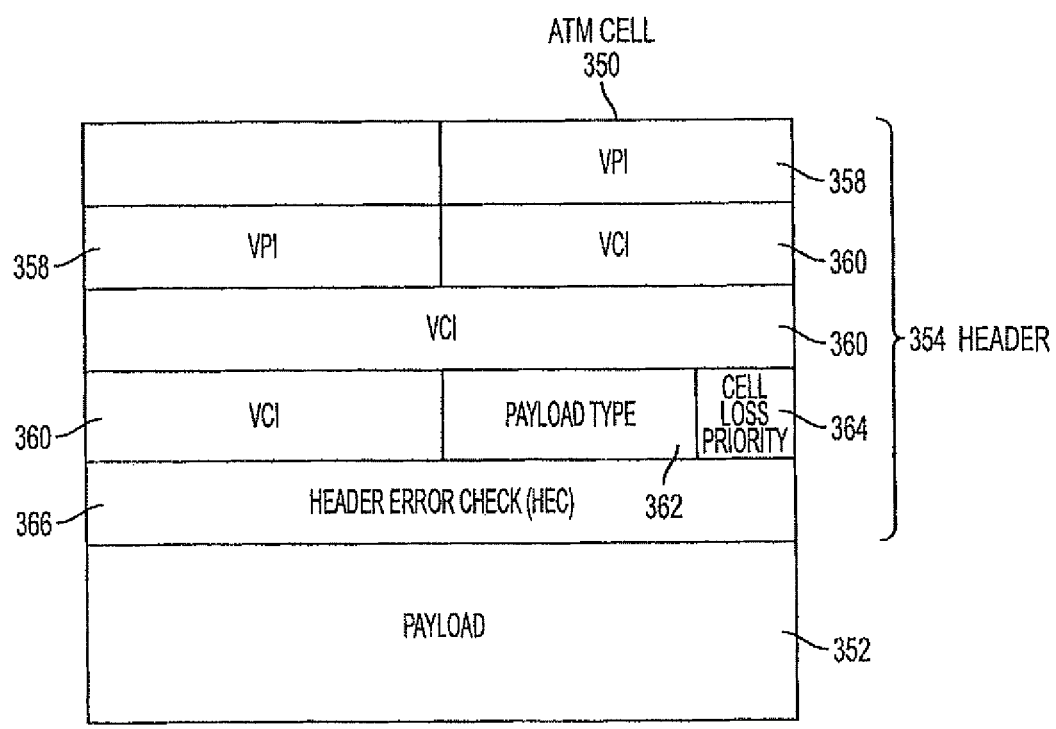
FIG. 21 illustrates the logical format of an ATM cell.

Once the ATM cells are located, ATM input processing must be performed on each ATM cell (see steps 114 and 116 in FIG. 8). During this input processing, the ATM cell header 303 for each ATM cell is sent to the ATM lookup engine 150 along with input port information. The remaining 48 bytes of the ATM cell are sent to the receive FIFO 152. FIG. 21 depicts the format of an ATM cell 350 in more detail. Each ATM cell is 53 bytes in length with 48 bytes of payload 352 and 5 bytes of header 354. The ATM cell 350 also contains a virtual path identifier (VPI) 358 that identifies virtual path for the ATM cell. The ATM cell 350 includes a virtual channel identifier (VCI) 360 that identifies the virtual channel for the cell. ATM cells use VCIs and VPIs to specify treatment of a cell. A VC (Virtual channel) is a connection between two communicating ATM entities. A VP (Virtual Path) is a group of VCs that is carried between two points. VPs provide a convenient technique for bundling traffic that is heading for the sane destination. In some instances, a switching node need only check for a VPI to relay traffic rather than checking a more complete address.

A payload type 362 is included in the header 354 and includes a three bit field that indicates whether the cell contains user information or contains associated layer management information. A cell loss priority bit 364 allows the specification of explicit loss priority for the cell. The header 354 of the ATM cell 350 also contains a field 366 that is used by the physical layer of the network for bit errors in the cell header.

Figure 22:
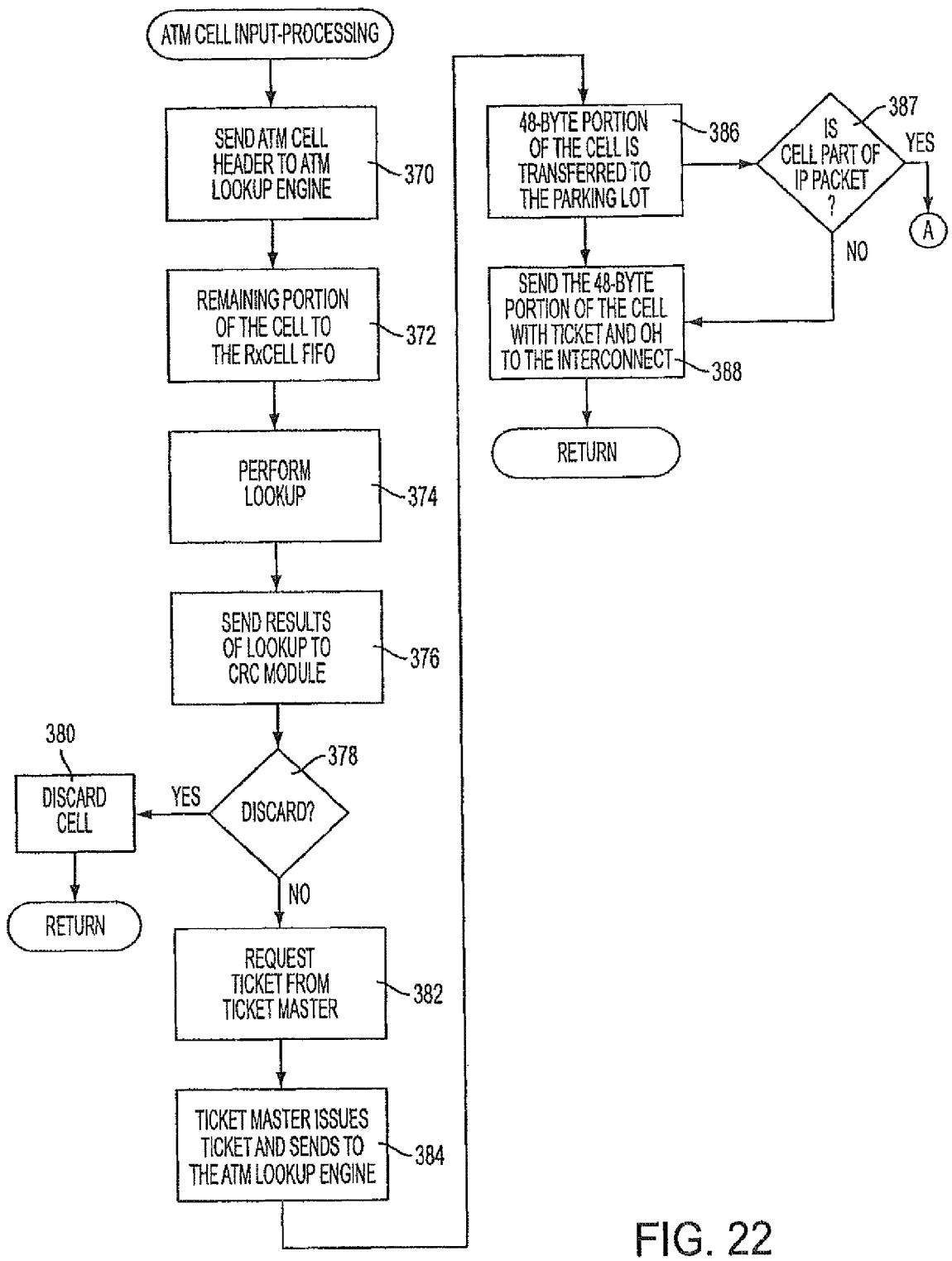
FIG. 22 is a flowchart illustrating the steps that perform during ATM cell input processing.

FIG. 22 shows a flow chart of the steps performed during the ATM input processing. As mentioned above, the ATM cell header 354 is sent to the ATM lookup engine 150 (step 370 in FIG. 22). The payload 352 is sent to the receive FIFO 372 (step 262 in FIG. 16). The ATM lookup engine 150 uses an ATM table 154 to perform a lookup to determine where to direct the ATM cell (step 374 in FIG. 22). The ATM lookup engine 150 plays a role in both the policing (see 126 in FIG. 9) and the lookup function (see 128 in FIG. 9). It should be appreciated that the ATM cell header 354 that is sent to the ATM lookup engine 115 does not include the HEC field 366. It should also be appreciated that the ATM lookup engine 150 performs a lookup as the 48 bytes of data are stored in the receive FIFO 152.

Figure 23:
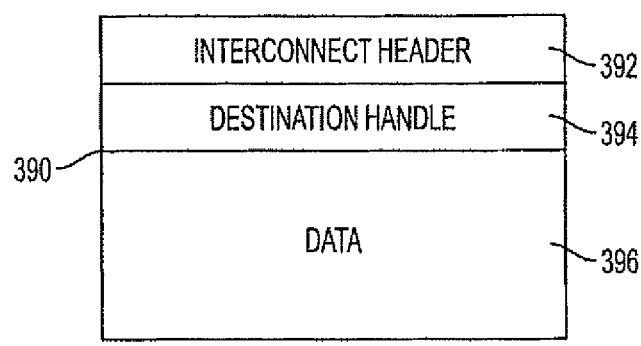
FIG. 23 illustrates the logical format of an internal cell.

The results of the lookup 150 (i.e. a destination handle) are sent to the CRC module 164 (step 376 in FIG. 22). The ATM lookup 150 may decide whether to discard, a cell or not as part of policing (see step 398 in FIG. 22). The appropriate cells are then discarded (step 380 in FIG. 22). If the cell is not to be discarded, a ticket is requested from the ticket master 162 (step 382 in FIG. 22). The ticket is a pointer to a location within a receive data parking lot 160 (FIG. 10). The receive data parking lot 160 is a place for storing data while processing is being performed. The ticket may be redeemed to extract the data from the location identified by the ticket. In response to the request, the ticket master 162 issues a ticket and sends the ticket to the ATM lookup engine 150 (step 384 in FIG. 22). The 48 byte portion of the cell containing data is then transferred to the receive data parking lot 160 from the receive FIFO 152. The data is stored at the location identified by the issued ticket (step 386 in FIG. 22). A check is made whether the ATM cell contains a portion of an IP packet (step 387 in FIG. 22). If it does, IP input processing must be performed beginning at Step 412 of FIG. 24 (described below). Otherwise, the 48 byte portion of the cell held in the receive data parking lot 160 is sent along with the ticket and the destination header to the interconnect 62 (step 388 in FIG. 22). In particular, an internal cell 390 with the format depicted in FIG. 23 is constructed. The internal cell 390 includes data 396 as well as the destination handle 394 for the cell. The interconnect header 392 holds header information that is used by the interconnect 62.

The decapsulation module 182 (FIG. 10) has a decapsulation table 184 that determines how data extracted from the received data packet shall be encapsulated into the internal cells (i.e. into canonical format). Placing the data in the canonical format varies with the type of data extracted. Raw ATM cells are the easiest case. For raw ATM cells, the payload of the ATM cells is combined with the header information and the destination handle to create the internal cell that is in sent over the interconnect 62. The cases where IP packets are to be sent in canonical format is discussed in more detail below.

Figure 24:
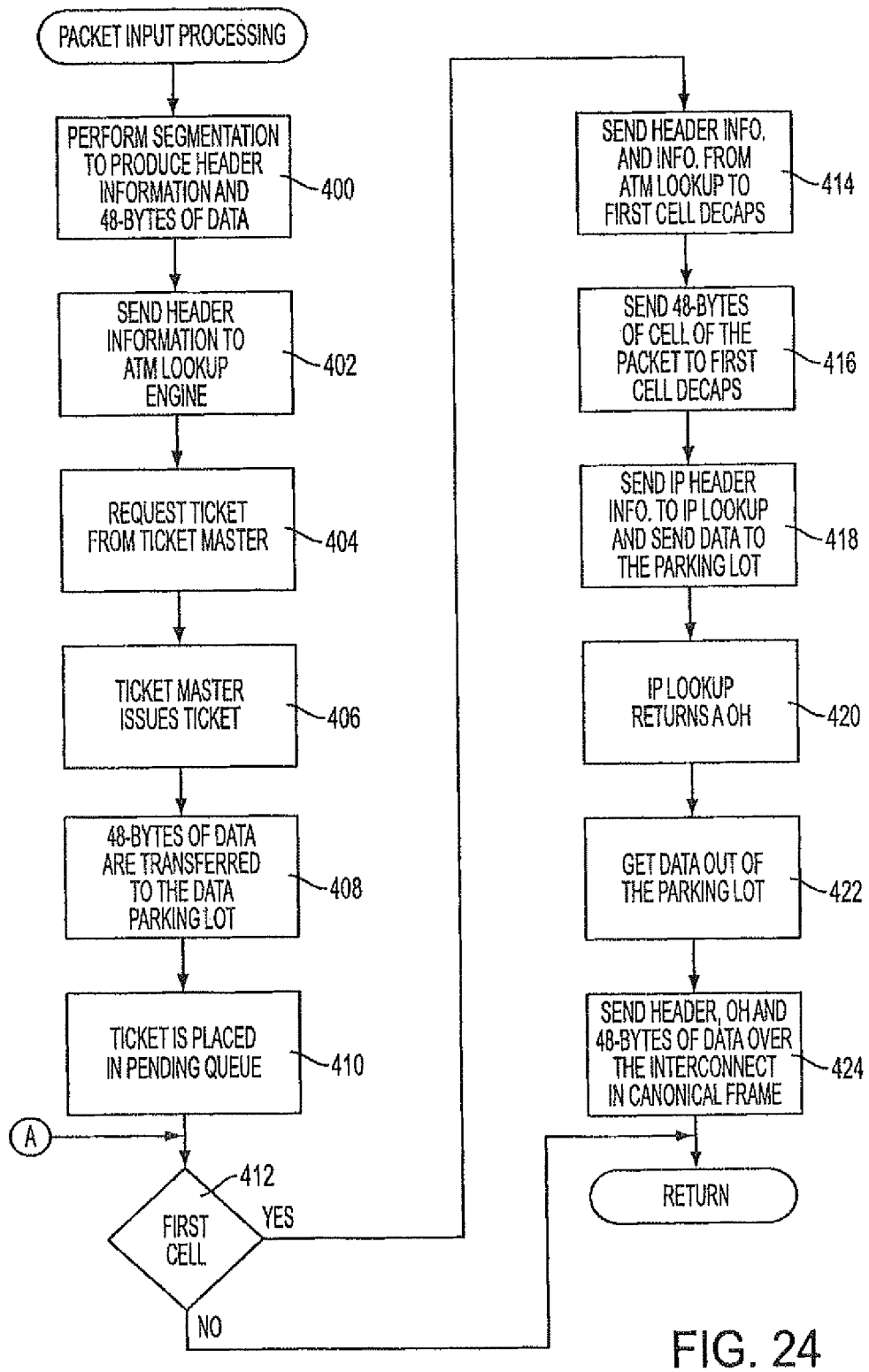
FIG. 24 is a flowchart illustrating the steps performed during IP input processing.

In step 118 of FIG. 8, it may be determined that the incoming data is not solely an ATM cell but rather is or is part of an IP packet. For instance, an ATM cell may contain a portion of an IP packet. IP input processing is performed (step 120 in FIG. 8). FIG. 24 is a flowchart that illustrates the steps performed during input processing for IP packets. If necessary, the IP packet is divided into pseudo-ATM cells by the AAL5 segmenter 148 (step 400 in FIG. 24). In the case where the input in packet over ATM, the IP packet may be held in one ATM cells or may be held in multiple ATM cells. The header information from each of the pseudo-ATM cells is sent to the ATM lookup engine 150 (step 402 in FIG. 24). A ticket is requested from the ticket master 162 (step 404 in FIG. 24). The ticket master 162 issues a ticket in response to the request (step 406 in FIG. 24). The 48 bytes of data from the packet are then transferred to the parking lot (step 408 in FIG. 24). The ATM lookup engine 150 recognizes the cell as containing IP packet data and places the ticket for the cell in the pending cells queue 166 (step 410 in FIG. 24). The pending cells queue 166 accumulates the cells that constitute a single packet so that all of the cells for a packet are transmitted to the same destination over the interconnect 62.

In order to understand how processing proceeds, it is helpful to consider the case where the PPP frame contains an IP packet. In such an instance, the receive ASIC 70 shreds the IP packet in the PPP frame into pseudo-ATM cells sends the headers to the ATM lookup engine 150 and the data 48 data bytes to the receive FIFO 152. The PPP frame is aliased into ATM cells so that ATM lookup engine 150 is able to process them. Specifically, traffic coming over a PPP context has a VPI/VCI with a preconfigured value of 0/1. This value is inserted into headers of the internal cells generated by the AAL5 segmenter 148. The VPI/VCI value of 0/1 for the PPP context is configured as a circuit that is routed. For frame relay frames, the VPI/VCI is set according to the incoming DLCI value. When processing incoming header data, the ATM lookup engine 150 returns either a destination handle or a placeholder destination handle. The placeholder destination handles are an indication that the incoming header is for an IP packet and requires further IP processing. The presence of the placeholder destination handle output causes the header information to be placed in the pending cells queue 166.

The ATM lookup 150 determines whether the cell is for the first cell of an IP packet (step 412 in FIG. 24). If it is determined that the cell is the first cell for an IP packet, the IP header information is located in the payload of the first cell which is available to the first cell decapsulation module 170 (step 414 in FIG. 24). The 48 bytes of data for the cell are sent from the receive FIFO 152 and to the first cell decapsulation module 170 (step 416 in FIG. 24). The first cell decapsulation module 170 decapsulates the information contained in the first cell's payload to send appropriate information to the IP lookup module 174 and the data is sent to the parking lot (step 418 in FIG. 24). The first cell decapsulation module 120 uses a decapsulation table 171 to identify how to decapsulate the cell. The IP lookup module 174 performs both forwarding lookup 132 (FIG. 9) and policing 130 for IP packets. The IP lookup module 174 returns a destination handle (DH) that identifies where to send the internal cells that will be sent over the interconnect 62 (step 420 in FIG. 24). The data is retrieved from the parking lot (step 422 in FIG. 24). IP packets are gathered into canonical frames that have the format of an AAL5 frame other than the trailer bytes being rearranged. The aggregation of multiple 48 byte chunks into a canonical frame enhances the efficiency of transmission across the interconnect 62. The canonical frame is sent over the interconnect 62 (step 424 in FIG. 24).

Figure 25:
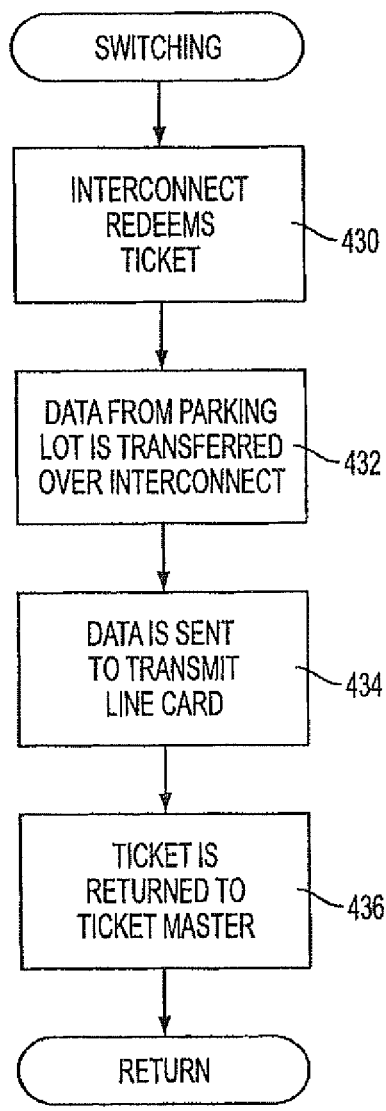
FIG. 25 is a flowchart illustrating the steps that are performed during the switching stage.

FIG. 25 is a flow chart that depicts the steps performed by the interconnect as a part of the switching stage 82 (FIG. 6). The interconnect redeems a ticket to obtain data from the received data parking lot 160 (step 430 in FIG. 25). The data from the parking lot is then transferred over the interconnect 62 (step 432 in FIG. 25). The data is sent to the appropriate transmit line card (step 434 in FIG. 25). The ticket is then returned to the ticket master 162 on the receive ASIC 70 (step 436 in FIG. 25). The interconnect is described in more detail in copending application entitled, "Interconnect Network For Operation Within A Communication Node," which is assigned to a common assignee with the present application and explicitly incorporated by reference herein.

Figure 26:
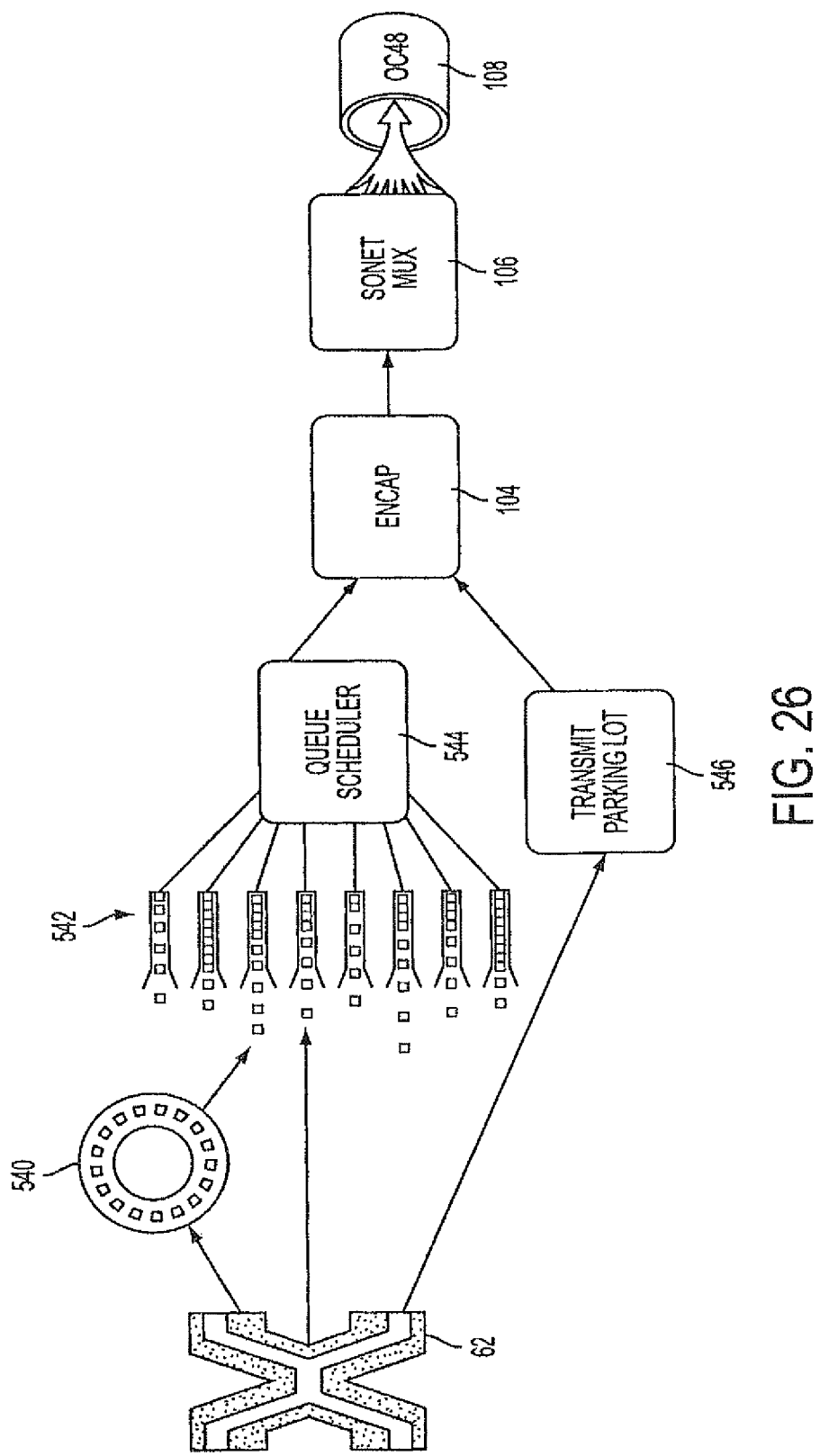
FIG. 26 is a functional diagram illustrating functional stages that are performed during output processing.

The interconnect 62 delivers the internal cells to the transmit ASIC 64. The transmit ASIC is responsible for performing output processing (see 84 in FIG. 6) so the appropriate output data stream is output over the appropriate port. This can be seen in FIG. 26, output traffic received from the interconnect 62 is buffered in the transmit parking lot 546 until the cell or packet is transmitted to it. If an internal cell is received as part of an IP packet, output processing is normally deferred until all of the internal cells for that packet have been received.

Figure 27:
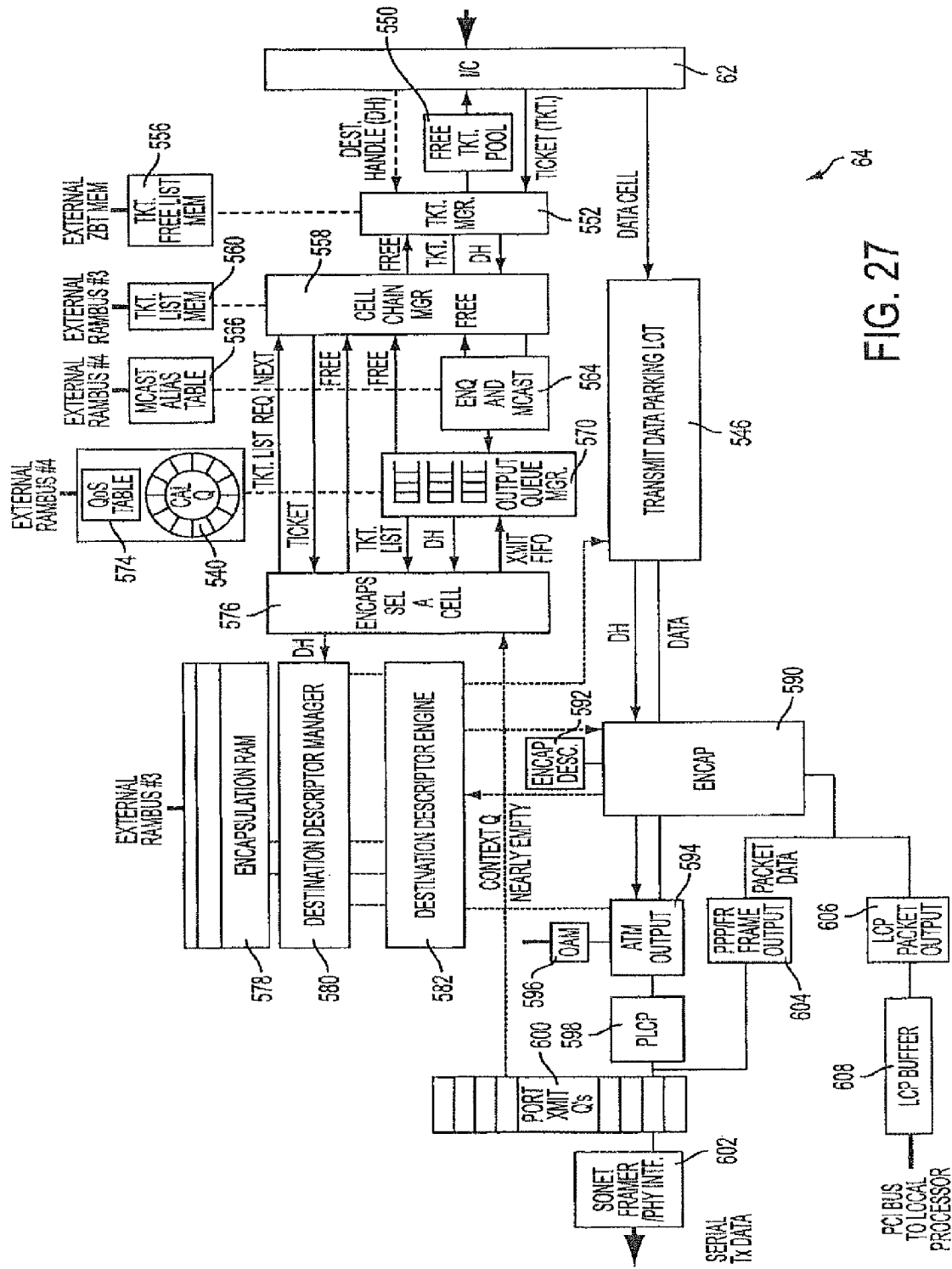
FIG. 27 is a more detailed diagram of the transmit ASIC 64 FIG. 5.

FIG. 27 depicts the functionality of the transmit ASIC 64 in more detail. The 64 byte internal cell is received from the interconnect 62. The interconnect header 392 (FIG. 23) is removed, and the data portion 396 of the internal cell 390 is sent to the transmit data parking lot 546. The transmit data parking lot 546 may be implemented as an SDRAM. Those skilled in the art will appreciate that the transmit data parking lot 546 may be implemented alternatively with a number of other types of memory devices.

A ticket manager 552 manages the distribution of tickets. The ticket manager 552 has access to a ticket free list memory 556 and accesses the memory 556 to provide the interconnect 62 a free ticket pool 550 of locations in the transmit data parking lot 546 that are available for use. The interconnect 62 chooses one of the free tickets and presents the ticket to the ticket manager 552. The interconnect 62 also asks for the data to be stored at the location identified by the ticket in the transmit data parking lot 546.

The ticket manager 552 is provided with the destination handle (DH) for the internal cell and passes the DH to the cell chain manager 558. The cell chain manager 558 accumulates packets of cell chains. In the customary case, the cell chain manager 558 makes sure that all components (i.e. chunks of data) of an IP packet are available before the IP packet is transmitted. There may also be a cut-through case wherein this restriction is relaxed.

The output queue manager 570 provides scheduling for implementing quality of service (QOS) options. It manages various output queues which will be described in more detail below. The output queue manager 570 cooperates with a QOS table 574 and a calendar queue 572.

The output data stream need not be a unicast data stream but rather may be a multicast data stream such that the same data stream is sent to multiple destinations. Component 564 in FIG. 29 is responsible for both enqueueing cells in the transmit queues and performing steps necessary to support multicast output. Multicast packets or cells are identified by component 564 and given a multicast identifier that corresponds to an ATM or IP multicast group. The packets or cells to be sent are replicated by component 564 to generate as many copies as there are destinations specified in a multicast alias table 566. The replicated data is input into the appropriate queues.

A calendar queue 540 is provided to shape or rate limit traffic. Data is regulated via the calendar queue 540 to be placed into the queues. If a cell or packet is to be shaped (i.e. output to QOS processing), then the cell or packet is passed through the calendar queue 540. As the calendar queue 540 delays outgoing traffic beyond the configurable threshold, the traffic is dropped. After the shaping is complete, the cell or packet in the input queue is transmitted to the specified output queue. The calendar queue 540 is a ring structure with slots corresponding to future moments in time. The calendar queue 540 has enqueue and dequeue pointers that are based on time. The dequeue pointers advance according to a time schedule based on the width of a slot and the calendar ring. The enqueue pointer points to the last slot that can safely be queued before the dequeue pointer gets to it. The two pointer advance together. Data is queued based on a desired rate such that a "future time" is calculated for the item to be queued based on the last transmit time. The "future time" cannot be less than the time slot pointed to by the enqueue pointer. The calendar queue 540 relies on the QOS table 524 to configure the calendar queue appropriately for the QOS being used The dequeue process for the calendar queue 540 is asynchronous relative to the enqueue process. The dequeue process, removes all entries for the slot of the "current time" and advances the enqueue and dequeue pointers. The entries removed from the "current" slot" are placed into the queue specified by their QOS treatment.

A queue scheduler 544 (in the output queue manager 570) is responsible for dequeueing data from the output queues 542. The queue scheduler 544 is provided within the output queue manager 570. The scheduler 544 implements both priority queueing and weighted round robin queueing. A programmable threshold divides priority queues from weighted round robin queues. The scheduler 544 first processes the priority queues, transmitting traffic in strict priority order. The rest of the queues are processed in weighted round robin order. The output queues are typically assigned to QOS classes, and the priority in weights on the queues configured accordingly. The priority threshold can be used to select priority queuing only or weighted round robin queuing only for all of the output queues.

The output queue manager 570 passes a ticket list and a destination handle to the encapsulation selector 576. The encapsulation 576 selector then retrieves the appropriate data from the output queues 542. The encapsulation selector 576 passes the destination handle for the selected cells to the destination description manager 580. The destination description manager 580 works in conjunction with the encapsulation engine 590 to determine how to appropriately encapsulate the data that is to be output. The encapsulation is independent of the original encapsulation of the data that was received by the receive ASIC 70. The encapsulation is performed on a per tributary or virtual circuit basis. The destination description manager 580 accesses encapsulation RAM 578 to obtain information regarding the appropriate encapsulation for the destination. The destination handle (which accompanies every cell) is used by the destination description manager 580 to locate a destination descriptor. The destination handle contains a destination descriptor ID, which may be used to access a destination descriptor. The destination descriptor is a structure containing the information and state necessary to re-encapsulate data. The information contained therein may includes partial CRC's and an indication of the length of a frame to be created. The destination descriptor contains an Encap identifier that references an Encap descriptor in a table of encapsulation descriptors 592. The Encap descriptor contains a pattern to be inserted into the beginning of an outgoing frame that identifies the pattern encapsulation. As mentioned above, the encapsulation relies on a pattern insertion technique deriving patterns from a programmable insertion storage.

The destination handle and data retrieved from the transmit data parking lot 546 of the appropriate encapsulations are gathered for ATM output. The resulting ATM cells are sent to ATM output module 594. The ATM output modules creates a correct AAL5 trailer and sets various bits in the cell. OAM 596 may be generated or outgoing OAM cells, generated by the LCP or forwarded from the receive ASIC 70, may need to be formatted. The resulting data is transmitted to the PLCP module 598. If no PLCP encapsulation is required, the cells pass through to the port transmit queue 600 without modification. Otherwise, the cells are encapsulated into PLCP frames by the PLCP module 598.

IP packets are passed to the PPP/FR output module 604, which is responsible for creating PPP frames or FR frames for encapsulating the data. The resulting frames are passed through the port transmit queues 600. Certain packets my need to passed to the LCP. The LCP packet output 606 is passed through a LCP buffer 608 and ultimately passed onto the LCP.

A SONET framer/physical interface 602 is provided for framing the data into SONET frames and for performing parallel to serial conversion. The SONET framer/physical interface 602 provides a physical interface to the output lines. The resulting data is the output towards its descriptor.

While the present invention has been described with reference to an illustrative embodiment thereof, those skilled in the art will appreciate the various changes in form and detail may be made without departing from the intended scope of the present invention as in the appended claims.

The invention claimed is:

1. A device comprising:
a first integrated circuit to:
 receive data,
 decapsulate the received data to obtain decapsulated data,
  the received data being intended for a network destination,
  the received data including:
   a data stream of a first type, and
   a data stream of a second type that is different than the first type,
   the data stream of the first type including a packet over synchronous optical network (SONET) data stream, and
  forward the decapsulated data; and
a second integrated circuit to:
 receive the decapsulated data,
 encapsulate the decapsulated data, in a particular format, to obtain encapsulated data,
  the particular format being associated with the network destination, and forward the encapsulated data for transmission to the network destination.

2. The device of claim 1, where, when decapsulating the data, the first integrated circuit is to:
decapsulate the data based on one or more patterns, of a plurality of patterns, that relate to decapsulating the data,
 the plurality of patterns being stored in a memory associated with the device.

3. The device of claim 1, where, when encapsulating the decapsulated data, the second integrated circuit is to:
encapsulate the decapsulated data using one or more patterns of a plurality of patterns,
 where the encapsulated data includes the one or more patterns, and
 where the plurality of patterns are stored in a memory associated with the device.

4. The device of claim 1, where the data further includes at least one of:
another data stream of the first type, or
another data stream of the second type.

5. The device of claim 1, where the first integrated circuit is further to:
perform first processing on data, associated with the data stream of the first type, after decapsulating the data received by the device, and
perform second processing on data, associated with the data stream of the second type, after decapsulating the data received by the device.

6. The device of claim 1, where the data includes a plurality of Internet Protocol packets.

7. The device of claim 1, where the encapsulated data includes:
the data stream of the first type, and
the data stream of the second type,
where the second integrated circuit is to multiplex the data stream of the first type and the data stream of the second type to obtain a multiplexed data stream, and
where, when forwarding the encapsulated data, the second integrated circuit is to:
 forward the multiplexed data stream for transmission to the network destination.

8. A method comprising:
receiving, by a first hardware component of a device, data,
 the data being intended for a network destination,
 the data including:
  a data stream of a first type, and
  a data stream of a second type that is different than the first type,
  the data stream of the first type including a packet over synchronous optical network (SONET) data stream;
decapsulating, by the first hardware component, the data to obtain decapsulated data,
 the data being decapsulated in the first hardware component;
forwarding, by the device, the decapsulated data to a second hardware component of the device;

encapsulating, by the second hardware component, the decapsulated data to obtain encapsulated data,
the decapsulated data being encapsulated in a format that is associated with the network destination,
the decapsulated data being encapsulated in the second hardware component; and
forwarding, by the second hardware component, the encapsulated data for transmission to the network destination.

9. The method of claim 8, further comprising:
separating the data received by the device into:
the data stream of the first type, and
the data stream of the second type that is different than the first type,
the data being separated prior to decapsulating the data.

10. The method of claim 9, further comprising:
performing first processing on data, associated with the data stream of the first type, after decapsulating the data; and
performing second processing on data, associated with the data stream of the second type, after decapsulating the data.

11. The method of claim 8, where decapsulating the data includes:
decapsulating the data based on a plurality of patterns relating to decapsulating the data.

12. The method of claim 8, where encapsulating the decapsulated data includes:
encapsulating the decapsulated data using one or more patterns of a plurality of patterns,
the encapsulated data including the one or more patterns.

13. The method of claim 8, where the encapsulated data includes:
the data stream of the first type, and
the data stream of the second type that is different than the first type,
the method further comprising:
combining the data stream of the first type and the data stream of the second type to obtain a combined data stream.

14. The method of claim 13, where forwarding the encapsulated data includes:
forwarding the combined data stream for transmission to the network destination.

15. A system comprising:
a first integrated circuit to:
decapsulate data to obtain decapsulated data,
the data being intended for a network destination,
the data including:
a data stream of a first type, and
a data stream of a second type that is different than the first type,
the data stream of the first type including a packet over synchronous optical network (SONET) data stream, and
forward the decapsulated data to a second integrated circuit; and
the second integrated circuit to:
encapsulate the decapsulated data to obtain encapsulated data, and
forward the encapsulated data for transmission to the network destination.

16. The system of claim 15, where, prior to decapsulating the data, the first integrated circuit is to:
separate the data into:
the data stream of the first type, and
the data stream of the second type that is different than the first type.

17. The system of claim 16, where the first integrated circuit is further to:
perform first processing on data, associated with the data stream of the first type, after decapsulating the data; and
perform second processing on data, associated with the data stream of the second type, after decapsulating the data.

18. The system of claim 15, where the second integrated circuit is further to:
combine the data stream of the first type and the data stream of the second type to obtain a combined data stream, and
where, when forwarding the encapsulated data, the second integrated circuit is to:
forward the combined data stream for transmission to the network destination.

19. The system of claim 15, where, when decapsulating the data, the second integrated circuit is to:
decapsulate the data based on one or more patterns, of a plurality of patterns, that relate to decapsulating the data.

20. The system of claim 15, where, when encapsulating the decapsulated data, the second integrated circuit is to:
encapsulate the decapsulated data using one or more patterns of a plurality of patterns,
where the encapsulated data includes the one or more patterns, and
where the decapsulated data is encapsulated in a particular format that is associated with the network destination.

* * * * *